(12) United States Patent
Tabata et al.

(10) Patent No.: US 6,340,339 B1
(45) Date of Patent: Jan. 22, 2002

(54) VEHICLE DRIVE DEVICE

(75) Inventors: Atsushi Tabata, Okazaki; Yutaka Taga, Aichi-ken; Ryuji Ibaraki; Shuji Nagano, both of Toyota; Seiji Nakamura, Nagoya; Masaya Amano, Toyota, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/389,755

(22) Filed: Sep. 7, 1999

(30) Foreign Application Priority Data

| Sep. 7, 1998 | (JP) | 10-253120 |
| Sep. 7, 1998 | (JP) | 10-253122 |
| Sep. 17, 1998 | (JP) | 10-263623 |
| Sep. 18, 1998 | (JP) | 10-265514 |

(51) Int. Cl.[7] .............................. F16H 3/72; F16H 37/06
(52) U.S. Cl. ........................ 475/5; 192/328; 290/4 C; 180/65.2
(58) Field of Search .......................... 475/5, 1; 477/2, 477/3, 5, 6; 180/65.2–65.5; 192/48.92; 290/4 C, 47, 46

(56) References Cited

U.S. PATENT DOCUMENTS

| 4,958,095 A | | 9/1990 | Uchida et al. ............... 310/59 |
| 5,697,466 A | * | 12/1997 | Moroto et al. ............. 180/65.2 |
| 5,789,823 A | * | 8/1998 | Sherman ...................... 290/47 |
| 5,931,271 A | * | 8/1999 | Haka ........................ 192/48.92 |
| 6,041,901 A | * | 3/2000 | Werner et al. ............. 192/3.28 |
| RE36,678 E | * | 5/2000 | Moroto et al. ............. 180/65.4 |
| 6,092,985 A | | 7/2000 | Winkam .................. 415/124.1 |

FOREIGN PATENT DOCUMENTS

| JP | 05-30605 | 2/1993 |
| JP | 08-168104 | 6/1996 |

* cited by examiner

*Primary Examiner*—Charles A. Marmor
*Assistant Examiner*—Tisha D. Lewis
(74) *Attorney, Agent, or Firm*—Oliff & Berridge, PLC

(57) ABSTRACT

A vehicle drive device is provided having a first source of driving force and a hydraulic transmission, into which power is input from the first source of driving force, arranged axially. A motor that transmits power by an electromagnetic action between a stator and a rotor is arranged between the first source of driving force and the hydraulic transmission. The stator is arranged to be radially distant from the rotational center axis of the hydraulic transmission. A small diameter portion formed to have a smaller outer diameter than an inner diameter of the stator is formed at a motor side of the hydraulic transmission and the hydraulic transmission is arranged with the small diameter portion being inserted axially into the inner periphery of the stator. As a result, the axial length of the vehicle drive device is shortened to thereby provide a small-size, lightweight device.

31 Claims, 13 Drawing Sheets

FIG. 10

| | C0 | C1 | C2 | B0 | B1 | B2 | B3 | B4 | F0 | F1 | F2 |
|---|---|---|---|---|---|---|---|---|---|---|---|
| P | ○ | | | | | | | | ○ | | |
| R(STOP) | ○ | | ○ | | | | | | ○ | | |
| R(TRAVELING) | | | ○ | ○ | | | | | | | |
| N | ○ | | | | | | | | ○ | | |
| 1st | ○ | ○ | | | △ | | | ○ | ○ | | ○ |
| 2nd | △ | ○ | | | | | | ○ | ○ | | |
| 3rd | ○ | ○ | | | | | ○ | | ○ | | |
| 4th | ○ | ○ | ○ | | | ⊗ | | | ○ | ○ | |
| 5th | | ○ | ○ | ○ | | ⊗ | | | ○ | | |

VEHICLE DRIVE DEVICE

INCORPORATION BY REFERENCE

The disclosures of Japanese Patent Application Nos. HEI 10-253120 filed on Sep. 7, 1998, HEI 10-253122 filed on Sep. 7, 1998, HEI 10-263623 filed on Sep. 17, 1998 and HEI 10-265514 filed on Sep. 18, 1998 including the specification, drawings and abstract are incorporated herein by reference in their entirety.

BACKGROUND OF THE INVENTION

1. Field of the Invention

The present invention relates to a vehicle drive device provided with at least a motor as the source of driving force for a running vehicle.

2. Description of the Related Art

Recently, there has been an increasing demand for improving the fuel consumption of a motor vehicle and reducing exhaust gas for environmental protection and effective use of resources. To meet the demand, a conventional internal combustion engine is replaced by or used together with a motor. That is, the former corresponds to an electric automobile and the latter corresponds to a hybrid vehicle. An example of the latter is described in Japanese Patent Application Laid-open No. HEI 08-168104.

The device described in HEI 08-168104 is a hybrid drive device having a motor at an engine output side, a torque converter and a transmission mechanism arranged in this order following the motor. This reference is intended to cancel the pulsation of the engine torque by means of the output torque of the motor. With the above structure in which the motor is associated with the engine and the torque converter, it is possible to regenerate and store energy during deceleration and to start or accelerate the vehicle using the electric power. This improves the fuel consumption and reduces exhaust gas emission.

The above device is achieved by adding a motor to a motor vehicle with an automatic transmission gear using an internal engine as a power source. However, motor vehicles have been subjected to downsizing, reduced weight, and increased cabin space. To meet the aforementioned demands, the capacity of the space accommodating the power unit and its attached equipment is considerably limited. Therefore, if the motor is added and installed linearly between the engine and torque converter as stated above, the overall axial length of the drive device or the size of the drive device is increased, thus deteriorating mountability.

In addition, if a motor is arranged adjacent to the torque converter, the torque converter acts as a coupling means for coupling a power source and a transmission such that the motor is coupled to the torque converter. In this case, the torque converter is expanded and contracted in accordance with a variation in the pressure of internal oil (fluid), which requires a structure for allowing the deformation of the torque converter. Also, the motor is required to accurately set and maintain a gap between a stator and a rotor. As the requirements for mechanisms of the torque converter and the motor are contradicting, it is quite a new technical challenge to provide a small, lightweight vehicle as a whole while satisfying such demands. There has been no conventional techniques to address the aforementioned challenge. Installation of the rotor of the motor generator to the front cover of the torque converter has been proposed for reducing the dimension in the axial direction. In such a case, the front cover may expand or contract resulting from variation of pressure applied to the fluid within the torque converter. As a result, the axial position of the rotor of the motor generator installed to the front cover displaces. This may shift the relative position of the thus displaced rotor with respect to the stator of the motor generator fixed to the transmission cover, thus deteriorating output characteristics. Furthermore, if means such as bolts and splines are employed as means for coupling the torque converter and the motor, there is a possibility of deteriorating the productivity of the overall device by increasing the number of mechanically processed parts and the number of assembly steps.

Moreover, if the fluctuation of the torque output from the engine is suppressed by the output torque of the motor, the output side member of the motor is coupled to the output axis of the engine or the output member thereof. The coupled portion of the means for coupling the engine to the motor and torque converter at the output side of the engine is covered with, for example, a casing. A spline axially slid and engaged is, therefore, normally employed.

In the device above, if the engine output side member is coupled to the motor side member by a spline, the rotor, which is a member at the engine output side, has a large angular moment of inertia. Further, due to the presence of a slight gap of the spline in rotational direction, the fluctuation (or pulsation) of the output torque of the engine causes the engine output side member and the rotor to repeated rotate relatively to each other by the small gap. As a result, the spline teeth repeatedly collide with one another in a rotational direction, thereby possibly causing abnormal sound or noise.

SUMMARY OF THE INVENTION

Under these circumstances, the present invention has been made. It is an object of the present invention to provide a vehicle drive device constituted and arranged to meet the mechanical demands while realizing overall downsizing of a hydraulic transmission and a motor.

To attain the above object, a first embodiment of the present invention provides a vehicle drive device comprising a motor including a rotating shaft, a hydraulic transmission provided adjacent the motor in a direction of a rotational center axis and having a shell housing a fluid, a first rotating member extending axially in one direction to said shell, integrally coupled to the shell and a rotating member of the motor and rotatably supported by a bearing member while a movement of the first rotating member to the axial direction is being stopped, and a second rotating member extending to the shell in the axial direction and in a direction opposite to a direction of the first rotating member, integrally coupled to the shell and rotatably supported by a bearing member while an axial movement of the second rotating member is being stopped.

According to the first embodiment, one of the rotating members, integral with the shell of the hydraulic transmission, and the rotating member of the motor are coupled to each other, whereas the other rotating member is rotatably supported by the bearing while the axial movement of the rotating member is stopped. Therefore, the rotating member of the motor is also prevented from moving in the axial direction. This results in the axial position of the rotor that rotates with the rotating member of the motor being fixed. As the axial movement of the rotor of the motor is arrested in the above way, the relative position between the rotor and stator of the motor can be accurately maintained compared with the conventional art in which the rotor of the motor is installed to the outer shell of the fluid gearing.On the other hand, the other rotating member integral with the shell of the hydraulic transmission is rotatably supported by another bearing while axial movement of the other rotating member is allowed. Therefore, if the shell of the hydraulic transmission is deformed due to the fluctuation of the pressure of the internal fluid, the rotating member supported by the other bearing moves axially. Thus, no excessive stress is generated due to the change of pressure. Also, the change of pressure is absorbed by the axial movement of the other rotating member, so that accuracy for supporting the hydraulic transmission and accuracy for the relative positions of the stator and the rotor of the motor can be maintained in a favorable state.

Next, a second embodiment of the present invention provides a vehicle drive device comprising a first housing having an inner peripheral surface, a barrier plate portion protruding radially inward from said inner peripheral surface of said first housing, a second housing to which said first housing is attached, a motor having a stator fixed onto an inner peripheral surface of said first housing and a rotor relatively rotating with said stator, a functional device fixed to said second housing, a hydraulic transmission provided inside of the second housing and adjacent the motor in a direction of a rotational center axis and having a shell housing a fluid, a first rotating member extending axially in one direction to said shell, integrally coupled to said shell and said rotating member of said motor and rotatably supported by a bearing member fixed at inner peripheral side of the barrier plate portion while an axial movement of said first rotating member is prohibited and a second rotating member extending axially to said shell and in a direction opposite to the one direction of said first rotating member, integrally coupled to said shell and rotatably supported by the function device while an axial movement of said second rotating member is allowed.

A third embodiment of the present invention provides a vehicle drive device including a first housing, a barrier plate portion protruding radially inward on an inner peripheral surface of the first housing, a second housing to which the first housing is attached, a functional device fixed to the second housing, a motor having a stator fixed onto an inner peripheral surface of the first housing and a rotor relatively rotating with the stator, and shaft members integral with the rotor and rotatably supported by a bearing member attached to an inner peripheral portion of the barrier plate portion and by the functional device.

According to the third embodiment, the shaft members integral with the rotor are supported by the barrier plate portion integral with the first housing to which the stator is attached. In addition, part of the other shaft member is rotatably supported by the functional device substantially integral with the second housing to which the first housing is attached. The rotor is not supported by the outer shell of the fluid gearing but supported rotatively by the first housing side. Therefore, the member that supports the rotor and the member that attaches the stator are integrated as a whole. As a result, the accuracy of maintaining the relative position between the stator and the rotor can be increased compared with the conventional art in which the rotor is installed to the outer shell of the fluid gearing.

A fourth embodiment of the present invention provides a vehicle drive device including a first source of driving force that generates power, a motor arranged, together with the first source of driving force, on a rotational center axis and including a stator arranged to be radially distant from the rotational center axis and a rotor relatively rotating with the stator, and a hydraulic transmission having a small diameter portion deformed to have a smaller outer diameter than an inner diameter of the stator, arranged so that the small diameter portion is inserted into an inner peripheral side of the stator and inputting power from the first source of driving force.

In the fourth embodiment, the hydraulic transmission may include an input side member, output side member, and a clutch radially arranged inside the small diameter portion and directly coupling the input side member and the output side member.

According to the fourth embodiment, the motor and the hydraulic transmission, which are connected in series in terms of power transmission, are arranged to radially overlap each other. That is, part of the hydraulic transmission intrudes into the axial space occupied by the motor. Due to this, the axial space can be effectively used and the axial length can be reduced.

A fifth embodiment of the present invention provides a vehicle drive device having a first source of driving force that generates power through an output member, a hydraulic transmission into which power is transmitted from the first source of driving force, a motor arranged between the first source of driving force and the hydraulic transmission and including a stator arranged to be radially distant outside of a rotational center axis and a rotor relatively rotating with the stator, and a damper coupled to the output member of the first source of driving force, arranged at an inner peripheral side of the stator and damping the power transmitted from the first source of driving force. According to the fourth embodiment, the damper coupling the first source of driving force and the hydraulic transmission are arranged to intrude into the axial space occupied by the motor, which is arranged between the first source of driving force and the hydraulic transmission. This makes it possible to effectively use the axial space and to reduce the axial length.

A sixth embodiment of the present invention provides a vehicle drive device including a first source of driving force that generates power, and has an output member, The accuracy of maintaining the relative position between the stator and the rotor can be increased compared with the conventional art in which the rotor is installed to the outer shell of the fluid gearing. A hydraulic transmission into which power is transmitted from the first source of driving force, a motor arranged between the first source of driving force and the hydraulic transmission and comprising a stator arranged to be radially distant from the rotational center axis and a rotor relatively rotating with the stator, a detector arranged at an inner peripheral side of the stator and detecting relative positions of the stator and the rotor in a rotation direction. According to this embodiment, even if the motor is of a type controlled by the relative positions of the stator and the rotor of the motor, the detector, which detects the relative positions of the stator and the rotor, is arranged at the same axial position as that of the motor. Thus, the axial space can be effectively used and the axial length can be reduced.

Furthermore, a barrier plate portion, arranged between the stator and the rotor and the member arranged at a side the first source of driving force may be provided. By doing so, the motor can be arranged in the space determined by the barrier plate portion, thereby maintaining the motor in a fluid-tight state and enhancing sealing property.

More desirably, the detector may include a detector stator and a detector rotor arranged between the stator and rotor of the motor and the first source of driving force and further may include a barrier plate portion arranged between the detector stator and the detector rotor, and the stator and the rotor of the motor. In addition, the detector stator may be attached onto a side surface of the barrier plate portion facing the first source of driving force, and the detector rotor and the rotor of the motor may be attached to a rotating shaft passing through the barrier plate portion. This makes it possible to reduce the axial length. Besides, the detector is attached to the side surface opposite the motor side, i.e., the surface oriented outside of the barrier plate portion among the side surfaces of the barrier plate portion. Due to this, before the first source of driving force is coupled, it is possible to operate the detector from outside, thereby facilitating fine adjustments of the relative positions of the detector stator and the detector rotor of the detector.

A seventh embodiment of the present invention provides a vehicle drive device including a first source of driving force that generates power, a hydraulic transmission into which the power is transmitted from the first source of driving force, an input shaft coupled to the hydraulic transmission and arranged along a rotational center axis of the hydraulic transmission, a motor arranged between the first source of driving force and the hydraulic transmission and including a stator arranged to be radially distant from the rotational center axis and a rotor attached to a portion radially protruding from the input shaft, a barrier plate portion extending radially to the first source of driving force in a direction of the rotational center axis with respect to the motor and including a through hole passing through the input shaft, a detector detecting relative rotations of the stator and the rotor in a rotation direction and including a detector rotor attached to the radially protruding portion of the input shaft at an inner peripheral side of the rotor of the motor and a detector stator fixed onto an inner wall surface of the barrier plate portion and facing the detector rotor radially.

An eighth embodiment of the present invention provides a vehicle drive device including a first source of driving force that generates power, a second source of driving force that has a rotatinal member, a rotating input member having a hub portion provided with a radially protruding plate-shape portion and rotating if the power is transmitted from the first source of driving force to the input member, a hydraulic transmission, into which the power is input from the first source of driving force, including a shell housing a fluid, in which part of the shell of the hydraulic transmission is formed by a front cover having an opening portion formed at a rotational center side, the front cover being integrally fixed to the hub portion and the hub portion forming the part of the shell by fitting the plate-shape portion of the hub portion into the opening portion of the front cover, and the rotational member of the second source of driving force is integrally attached to a portion of the hub portion, the portion being positioned outside of the shell.

Further, the rotating input member may include an input shaft coupled to the output member of the first source of driving force and the hub portion may be formed integrally at an end portion of the input shaft at the hydraulic transmission side. According to this embodiment, the input member serves as a member transmitting power from the first source of driving force to the hydraulic transmission and as a member coupling the second source of driving force and the hydraulic transmission, and the hub portion thereof forms part of the shell of the hydraulic transmission. Due to this, a small space suffices for the coupling portion of these members and the number of parts decreases. As a result, the axial length of the device is shortened as a whole. Additionally, it is possible to employ fixing means, such as welding, as means for integrating the hub portion and the front cover, thereby ensuring the sealing property of the hydraulic transmission. Further, it is possible to integrally form the hub portion of the input means, the front cover and the rotational member of the second source of driving force, thereby not only improving production workability but also reducing assembly man-hours and therefore realizing high productivity.

A ninth embodiment of the present invention provides a vehicle drive device including a first source of driving force that generates power and has a output member, a second source of driving force that has a rotational member, a damper mechanism attached to the output member of the first source of driving force, and a hydraulic transmission having an input side member coupled through a spline to an output side member of the damper mechanism, an rotatinal member of the second source of driving force being coupled to the input side member.

According to the ninth embodiment, the power transmitted from the first source of driving force is transmitted to the damper mechanism, from which the power is transmitted to the hydraulic transmission. At the same time, even if the torque transmitted from the first source of driving force is fluctuated or pulsated, the fluctuation or pulsation is suppressed or leveled by the damper mechanism. Thus, even when the damper mechanism and the input side member of the hydraulic transmission are coupled by a spline and the angular moment of inertia of the rotational member of the second source of driving force acts on the input side member, it is possible to suppress or prevent the occurrence of abnormal sound or noise to the spline portion.

A tenth embodiment of the present invention provides a vehicle drive device including a first source of driving force that generates power and has an output member, a second source of driving force that has a rotational member, a flywheel attached to the output member of the first source of driving force and suppressing a fluctuation of torque output from the first source of driving force, a damper mechanism attached to the flywheel, and a hydraulic transmission having an input side member coupled through a spline to an output side member of the damper mechanism and coupled to the rotational member of the second source of driving force.

With this configuration, the flywheel is rotated by the power transmitted from the first source of driving force and the power is transmitted from this flywheel to the input side member of the hydraulic transmission through the damper mechanism. At the same time, power is transmitted from the input side member to the rotational member of the second source of driving force. In other words, the angular moment of inertia of the rotational member of the second source of driving force acts on the output side member of the damper mechanism. Thus, the fluctuation of torque output from the first source of driving force is suppressed by the flywheel, which has a large angular moment of inertia (or the degree of torque fluctuation is reduced by the damper mechanism). In short, the fluctuation of torque is leveled. Owing to this, even if the input side member of the hydraulic transmission is coupled to the output side member of the damper mechanism by a spline, it is possible to prevent or suppress the teeth of the spline from repeatedly colliding with one another and abnormal sound or noise from occurring following the collision.

The motor does not limit a device which have only a function of a motor. There are various types of motors, for example, a motor which has only a function of a generator, or a motor which has a function of both a motor and a generator.

BRIEF DESCRIPTION OF THE DRAWINGS

FIG. 10 is a table showing engagement operation of clutches and brakes for setting the respective speeds of the automatic transmission;

DETAILED DESCRIPTION OF THE PREFERRED EMBODIMENTS

Figure 2:
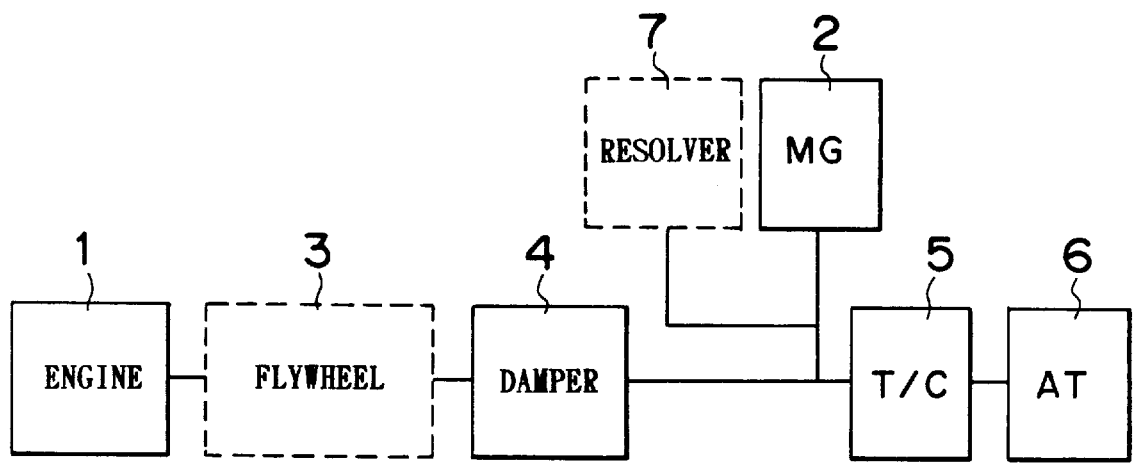
FIG. 2 is a block diagram showing the principle of an exemplified array of a drive device according to the present invention.

The present invention will be described with reference to the accompanying drawings. FIG. 2 shows the basic configuration of a drive device according to the present invention. The drive device is provided with the first source of driving force 1 and a second source of driving force 2. The first source of driving force 1 is a device for that outputs power by fuel combustion. An engine for firing a gas fuel, such as a liquefied petroleum gas and natural gas, is an example of the first source of driving force 1. The present invention is particularly effective if an engine in which output torque is repeatedly fluctuated (pulsated) is used as the first source of driving force 1. The first source of driving force 1 will be referred to as an engine 1 in the description given hereinafter.

The second source of driving force 2 is, in short, a source of driving force of a type different from that of the engine 1. The source 2 is basically a device capable of that outputs power without causing the fluctuation (pulsation) of the torque. A motor capable of converting electric energy to a kinetic energy, such as rotational motion, is an example of the second source of driving force 2. The present invention is particularly effective in the case where a motor having a power generation function (regeneration function) is employed. The second source of driving force 2 will be referred to as a motor generator 2 in the description given hereinafter.

A flywheel 3 is coupled to the above-stated engine 1. The flywheel 3 is provided to suppress the fluctuation of the torque of the engine 1 as in the case of a flywheel attached to a conventional gasoline engine or diesel engine. The flywheel 3 is a disc-shaped member having a large angular moment of inertia. A damping mechanism (damper) 4 is coupled to the flywheel 3. The damper 4 is a mechanism attenuating the fluctuation of power input from the flywheel 3, that is, decreasing (or leveling) the amplitude of oscillation or pulsation. The damper 4 of various constitutions may be used as required. Normally, a damper is employed having an elastic member that is interposed between a relatively rotatable input-side member and an output-side member and oscillation is attenuated by the expansion and contraction of the elastic member. It is noted that the flywheel 3 and the damper 4 can be integrally assembled in advance. Since the flywheel 3 is the member that can be selectively used, it is possible to directly couple the engine 1 and the damper 4 without using the flywheel 3.

A hydraulic power transmission 5 is coupled to the damper 4 and a transmission 6 is coupled to the output side of the hydraulic power transmission 5. The hydraulic power transmission 5 in the drive device, to which the present invention is directed, may be capable of transmitting power through a fluid. The hydraulic power transmission 5 may also be a device without a torque amplification function or a device having a torque amplification function (torque converter). Also, a hydraulic power transmission without a lockup clutch selectively and directly coupling the input side member and the output side member, which mutually transmit torque through a fluid or a hydraulic power transmission with a lockup clutch, may also be used. Description will be given hereinafter with a torque converter (T/C) 5 having a lockup clutch as an example.

Meanwhile, the transmission 6 is a device capable of appropriately changing the ratio (transmission gear ratio) of the input rotational speed to the output rotational speed. A stage transmission or a non-stage transmission capable of continuously changing the transmission gear ratio can also be used as the transmission 6. Also, the transmission may be an automatic or manual transmission. Description will be given hereinafter, while using an automatic transmission (AT) 6 as the transmission 6.

The motor generator 2 is coupled to a member which couples the damper 4 and the torque converter 5, i.e., the member at the input side of the torque converter 5. The motor generator 2 and the torque converter 5 are arranged adjacent each other along the central axes of rotation thereof. That is, the drive device is configured such that the power of the engine 1 and that of the motor generator 2 can be output to the automatic transmission 6 through the torque converter 5. If a permanent magnet type synchronous motor is used as the motor generator 2, a resolver 7 for detecting the rotation angle of a rotor, as the output side member of the motor generator 2, is arranged parallel to the motor generator 2. In this case, the rotor of the resolver 7 is coupled to the member that couples the damper 4 and the torque converter 5 or the member at the input side of the torque converter 5 as in the case of the rotor of the motor generator 2.

Figure 3:
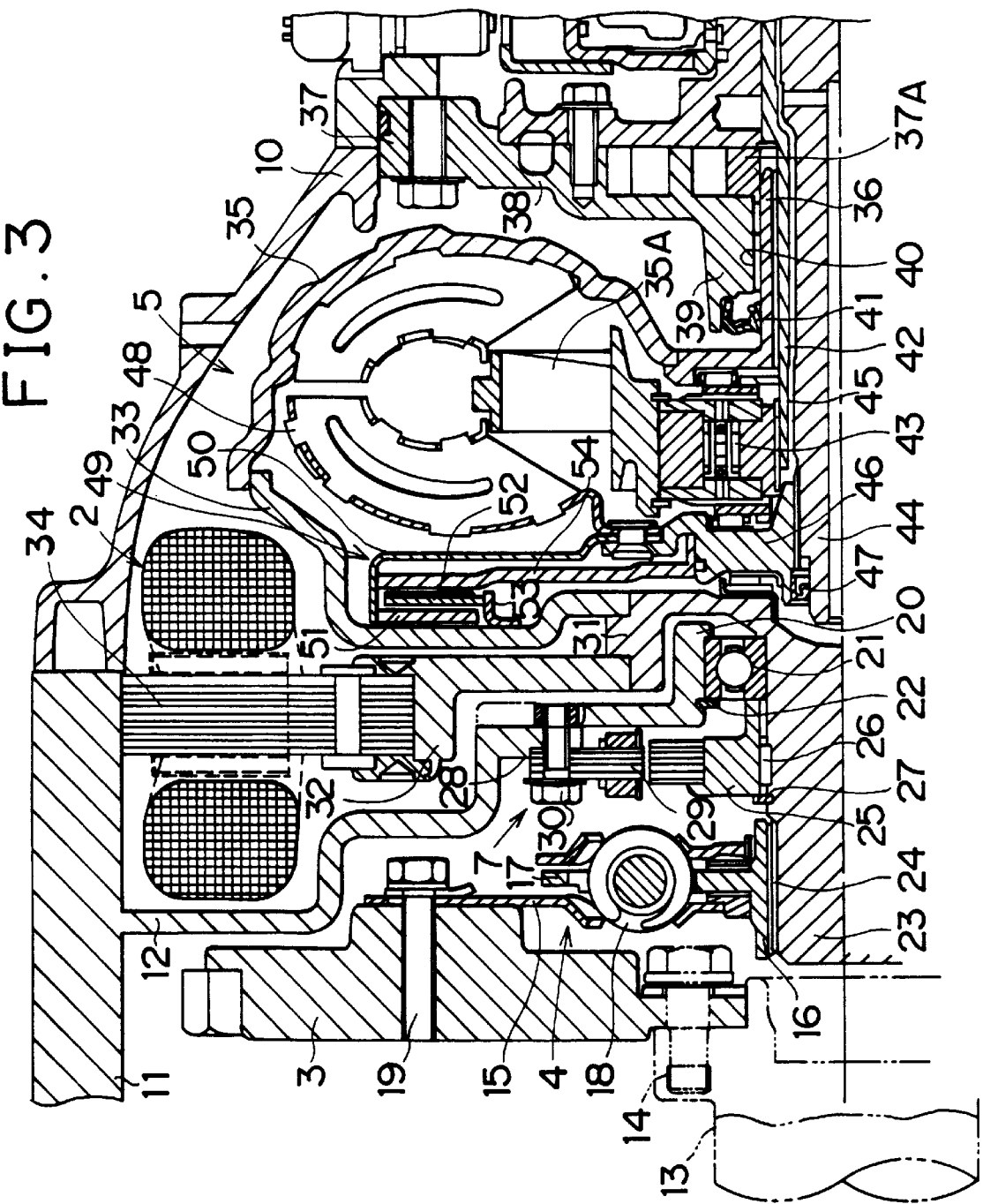
FIG. 3 is a partial cross-sectional view specifically showing an example of the drive device according to the present invention.

FIG. 3 more specifically shows the device of FIG. 2 in a partial cross-sectional view. An adapter 11 is attached to the engine 1 side end portion of a transmission housing 10, which houses the torque converter 5. The adapter 11 is a cylindrical member having an outer diameter almost equal to that of the engine side opening end of the transmission housing 10 and fixedly coupled to the transmission housing 10 and the engine 1 while being located between the end portion of the transmission housing 10 and the engine 1. A barrier plate portion 12, which extends to be appropriately curved toward the central axis of the adapter 11, is formed integrally with the adapter 11 at an axially intermediate portion on the inner peripheral surface of the adapter 11. A through hole having an axis corresponding to the central axis of the torque converter 5 is formed in the barrier plate portion 12.

The tip end portion of a crankshaft 13, which is the output member of the engine 1, extends into the engine 1 side space of the space at the inner periphery of the adapter 11 and partitioned by the barrier plate portion 12. The flywheel 3 is fixed to the tip end portion of the crankshaft 13 by a bolt 14. The damper 4 is attached to the front surface (which is opposite to the engine 1) of the flywheel 13. Thus, the flywheel 3 and the damper 4 are housed in the engine 1 side space partitioned by the barrier plate portion 12 at the inner periphery of the adapter 11.

The damper 4 includes a driving side member 15, a driven side member 17 and a damper spring 18. The driving side member 15 includes a first disk-shaped plate and a second plate. The first disk-shaped plate is a flat plate extending radially outward and has a through hole at the center thereof and a pore portion spaced from the central axis of the through hole. The second plate attaches to face the central portion of the first plate and has a pore portion like the first plate. The driven side member 17 has a plate-like protrusion extending relatively rotatably between the respective plates of the driving side member 15 and integrated with the outer peripheral side of a cylindrical boss 16 and a pore portion corresponding to the above-stated pore portions at the plate-like protrusion. The damper spring 18 is held by the above pore portions and compressed by the driving side member 15 and the driven side member 17 if the members 15 and 17 relatively rotate. The flat plate portion of the driving side member 15 extending radially outward is fixed to the front surface of the flywheel 3 by a bolt 19. That is, the driving side member 15 serves as an input side member of the damper 4 and the driven side member 17 serves as an output side member of the damper 4.

The inner peripheral side end portion of the barrier plate portion 12 is formed into the shape of a relatively short, axially extending cylinder. A bearing 21 is fitted into the cylindrical portion 20. The bearing 21 is fixed by a snap ring 22 which is a fixing member attached on the inner peripheral surface of the cylindrical portion 20. An input shaft 23 is fitted into the inner peripheral side of the bearing 21. Thus, the input shaft 23 is rotatably supported by the barrier plate portion 12 through the bearing 21 and also fixed in axial direction.

The tip end portion (or the left end portion in FIG. 3) of the input shaft 23 extends into the inner peripheral portion of the damper 4 and is also inserted into the boss 16 of the driven side member 17 of the damper 4. The input shaft 23 and the driven side member 17 are coupled to each other by a spline 24 formed at both the input shaft 23 and the driven side member 17. The rotor 25 of the resolver 7 is fitted into a portion on the outer peripheral portion of the input shaft 23, which is adjacent the bearing 21. The rotor 25 is attached to the input shaft 23 by a key 26 such that the rotor 25 is prevented from rotating and fixed axially by a snap ring 27. That is, the right end portion of the rotor 25 in FIG. 3 abuts on the bearing 21 and the rotor 25 is, therefore, fixedly placed between the bearing 21 and the snap ring 27.

The intermediate part of the barrier plate portion 12 is, as shown in FIG. 3, bent twice in axial direction. A plurality of faucet fitting portions 28 are formed on the inner peripheral surface of the bent portion in circumferential direction to keep a certain distance from one another. The stator 29 of the resolver 7 is fitted into the faucet fitting portion 28 and fixed thereto by a bolt 30. To be specific, the stator 29 is provided at a position corresponding to that of the rotor 25 in the axial direction and adjacent to the outer peripheral surface of the rotor 25. A portion of the stator 29 through which the bolt 30 is passed is an elongated pore along the circumferential direction of the stator 29 and the bolt 30 is inserted from the engine 1 side barrier plate portion 12 and screwed with the barrier plate portion 12. Thus, before the damper 4 is fitted into the input shaft 23 by the spline, the stator 29 is rotated in the circumferential direction with the bolt 30 loosened, thereby adjusting the circumferentially relative position of the stator 29 to the rotor 25.

Figure 4:
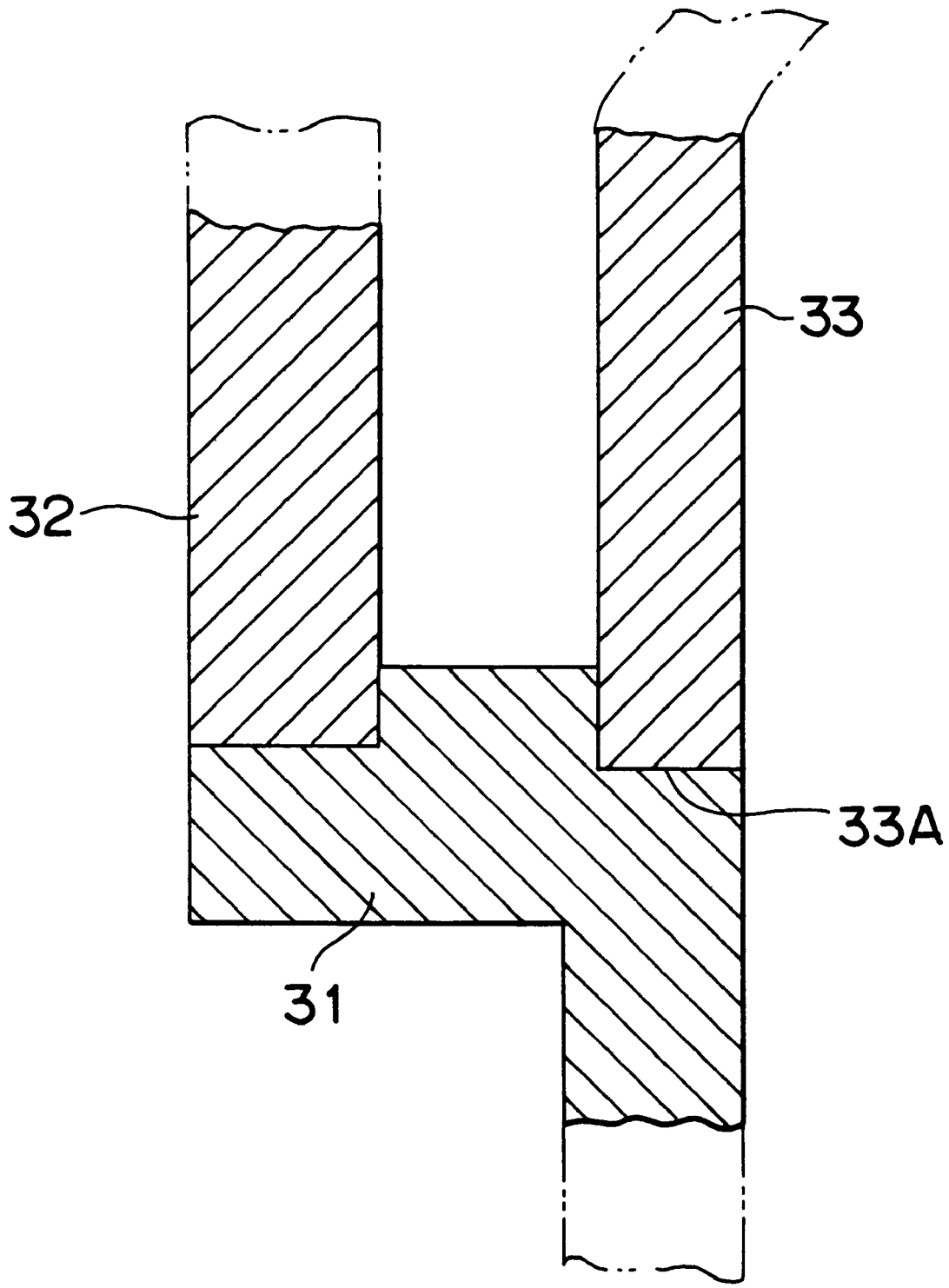
FIG. 4 is a partial cross-sectional view showing an example of a coupling structure among an input shaft, the rotor of a motor generator and a front cover according to the present invention.

The rear end portion (or the right end portion in FIG. 3) of the input shaft 23 extends outside of the cylindrical portion 20 of the barrier plate portion 12 radially in the vicinity of the tip end portion of the cylindrical portion 20. A hub portion 31 is formed at the portion extending radially outward. Thus, the hub portion 31 is housed in a space opposite to the damper 4 with the barrier plate portion 12 between the hub portion 31 and the damper. The hub portion 31 is also arranged at a position concentric with the cylindrical portion 20 at the outer peripheral side of the cylindrical portion 20. A rotor 32 of the motor generator 2 and a front cover 33 of the torque converter 5 are integrally coupled to the hub portion 31. FIG. 4 is an enlarged view of an attachment structure in which the rotor 32 and the front cover 33 are attached to the hub portion 31. The input shaft 23, therefore, corresponds to an input member in this invention.

The hub portion 31 is a cylindrical portion having a predetermined axial length. The rotor 32 is a disc-shaped member having a through hole at the center thereof and a permanent magnet provided on the outer peripheral portion thereof. The rotor 32 is attached to the hub portion 31 by integrating the inner peripheral portion of the disc-shaped rotor 32 with the left end portion of the hub portion 31 in FIGS. 3 and 4 by fixing means such as welding. Since the input shaft 23 is positioned axially by the barrier plate portion 12 through the bearing 21, the rotor 32 as well as the input shaft 23 is positioned axially by the barrier plate portion 12 through the bearing 21 and rotatably supported by the bearing 21. In addition, the thrust load on the torque converter 5 is received by the barrier plate portion 12 through the bearing 21.

A stator 34 is arranged at the outer peripheral side of the rotor 32. The stator 34, which consists of a layered core and a coil, is fixed onto the inner peripheral surface of the adapter 11. The layered core adjacently faces the permanent magnet of the rotor 32 radially. The coil projects axially compared to the layered core. Thus, in the motor generator 2, the coil protrudes axially and the permanent magnet of the rotor 32 is provided inside greatly compared with the coil in axial direction. Moreover, in the motor generator 2, the disc-shaped portion to which the permanent magnet is attached, i.e., the member of the input shaft fixed to the hub portion is the thinnest and provided further inside in the axial direction. The barrier plate portion 12 is bent along such a profile of the motor generator 2.

Therefore, a part of the flywheel 3 is provided inside of the inner periphery of the coil protruding to the engine 1 side (left side in FIG. 3) and the damper 4 is arranged at the inner periphery of the coil. That is to say, the damper 4, part of the flywheel 3 and part of the stator 34 are aligned radially, thereby effectively using the space and reducing the axial length. Furthermore, the rotor 25 of the resolver 7 is separated from the rotor 32 of the motor generator 2 and attached to the input shaft 23. By doing so, the resolver 7 is placed outside of the space in which the motor generator 2 is housed and arranged at the inner periphery of the rotor 32 in the motor generator 2. In this respect, the number of the members arranged radially increases to thereby reduce the axial length. The stator 34 and the permanent magnet of the rotor 32 are positioned at the outer periphery with respect to the rotational center as much as possible, thereby increasing a torque generated and making the motor generator 2 smaller in size.

Meanwhile, the front cover 33 is a member integrated with a pump shell 35 of the torque converter 5 and covering the outside of the torque converter 5. The front cover 33 is a disc-shaped member having a modified cross-section as shown in FIG. 3. An opening portion 33A of a predetermined radius is formed at the rotational center of the front cover 33 as shown in FIG. 4. The radially intermediate portion in the vicinity of the opening portion 33A is relatively simple flat plate shaped along the radial direction, whereas the outer peripheral portion of the front cover 33 is curved to extend around the inner periphery of the coil, which protrudes axially. The tip end portion of the curved outer peripheral side is integrated with the tip end portion of the pump shell 35 by fixing means such as welding, and the tip end portion of the inner peripheral side is integrated with the axially other end portion (right end portion in FIGS. 3 and 4) by fixing means such as welding. Thus, the hub portion 31 as well as the front cover 33 forms part of the shell of the torque converter 5. The portion of the rotor 32 attached to the hub portion 31 is positioned outside of the shell of the torque converter 5.

The portion extending radially from the rotational center of the pump shell 35 is curved to have a bowl-shaped cross-section and a pump blade is fixed into the internal surface of the bowl-shaped cross section to-thereby form a pump impeller as in the case of the pump shell of the conventional torque converter. The other end portion (right end portion in FIG. 3) of the pump shell 35 becomes a cylindrical shaft 36 having the same central axis as that of the input shaft 23. The cylindrical shaft 36 is inserted into the inner periphery of the boss 39 of a body 38 of the hydraulic pump 37 and rotatably held by a bushing 40 inserted into the inner peripheral portion of the boss 39 in a state in which the cylindrical shaft 36 is axially movable. The bushing 40 also functions as a slide bearing. The slide bearing may be replaced by a rolling bearing, allowing the cylindrical shaft 36 to be axially moved.

Thus, the front cover 33, the hub portion 31 attached to the front cover 33, and the pump shell 35 form the shell of the torque converter 5. The input shaft 23 and the cylindrical shaft 36 integral with the hub portion 31 correspond to the rotating means integral with the shell in this invention. The bearing 21 and the bushing 40 correspond to one of the bearing members and the other bearing member in this invention, respectively.

The hydraulic pump body 38 is fixed onto the inner peripheral surface of the transmission housing 10. A rotor 37A is rotatably housed in the body 38 and the tip end portion of the cylindrical shaft 36 of the pump shell 35 is engaged with the rotor 37A. In other words, the hydraulic pump 37 is driven by the power transmitted to the input shaft 23. An oil seal 41 is provided between the tip end portion of the boss 39 and the outer peripheral surface of the cylindrical shaft 36. By forming the bearing 21 into a seal structure, the space in which the motor generator 2 is housed is kept fluid-tight.

Therefore, the rotor 32 corresponds to an output member of the present invention. The adapter 11 and the transmission housing 10 correspond to the first housing and the second housing, respectively. The hydraulic pump 37 corresponds to the functional device of the present invention.

A fixed shaft 42 of cylindrical shape is arranged at the inner peripheral side of the cylindrical shaft 36 on the same axis. The fixed shaft 42 is a supporting shaft integral with the body 38 of the hydraulic pump 37 and the tip end portion of the fixed shaft 42 extends to the interior of the torque converter 5. The inner race of a one-way clutch 43 is fitted into and attached to the outer periphery of the tip end portion of the fixed shaft 42 by a spline and a stator 35A is attached to the outer race of the one-way clutch 43.

Further, a transmission input shaft 44 is inserted into the inner peripheral side of the fixed shaft 42 and rotatably supported by a bearing 45 provided between the shaft 44 and the inner peripheral surface of the fixed shaft 42. The tip end portion of the transmission input shaft 44 protrudes toward the tip end portion of the fixed shaft 42 and a hub 46 is fitted into the tip end portion of the transmission input shaft 44 by a spline. A portion between the hub 46 and the transmission input shaft 44 is fluid-tight sealed by an oil seal 47.

A turbine runner 48 and a lockup clutch 49 are communicated with the hub 46. The turbine runner 48 has a structure in which a plurality of blades are fixed onto the inner surface of the bowl-shaped shell. The shape of the turbine runner 48 and that of the pump impeller are almost symmetrical. The turbine 48 is arranged to face the pump impeller with the stator 35A placed therebetween.

The lockup clutch 49 is a multiple-plate clutch and provided to face the inner surface of the front cover 33. That is, a clutch drum 50 is arranged to face the front surface of a flat-shaped portion at a radially intermediate part of the front cover 33. The clutch drum 50 is a generally bottomed, cylindrical member and arranged to face the inner surface of the intermediate part of the front cover 33. The inner peripheral end portion of the clutch drum 50 is fixed to and integrated with the hub 46 by a rivet. A friction plate 51 is fitted into the outer peripheral, cylindrical inner surface of the clutch drum 50 by a spline. Another friction plate 52 is arranged at a position at which the plate 52 faces the inner surface of the front cover 33 with the friction plate 51 placed therebetween. The friction plate 52 is fitted into the outer peripheral side of a link-shaped retainer 53 attached to the inner surface of the front cover 33. Further, a piston 54 is arranged to face the inner surface of the front cover 33 and to move in an axially fore and aft direction while the friction plates 51 and 52 are placed between the piston 54 and the inner surface of the front cover 33. The piston 54, which is an annular plate member, has an inner peripheral portion slidably fit into the hub 46 in a fluid-tight state and an outer peripheral portion slidably contacting with the inner peripheral surface of the cylindrical portion of the clutch drum 50.

A space defined by the above-stated front cover 33 and the pump shell 35, i.e., the interior of the torque converter 5, is filled with oil (automatic transmission fluid). The helical oil flow generated by the rotation of the pump impeller together with the input shaft 23 is supplied to the turbine runner 48 to thereby rotate the turbine runner 48, with the result that power is transmitted from the input shaft 23 to the transmission input shaft 44. Thus, the input shaft 23 serves as the input side member of the torque converter 5.

Additionally, the oil pressure of the back face side of the piston 54, i.e., the side opposite the friction plates 51 and 52, is set higher than that of the front surface side, i.e., the side of the friction plates 51 and 52. By doing so, the friction plates 51 and 52 are placed between the piston 54 and the inner surface of the front cover 33. Consequently, power is transmitted from the front cover 33 to the clutch drum 50, the hub 46 and transmission input shaft 44 through the friction plates 51 and 52. Namely, by engaging the lockup clutch 49 with the torque converter 5, power is directly transmitted from the input shaft 23 to transmission input shaft 44 through the lockup clutch 49.

The position at which the lockup clutch 49 is thus provided is a position opposed to the flat plate portion at the radially intermediate part of the front cover 33. This position is the inner peripheral side of the stator 34 of the motor generator 2, or, to be exact, the inner peripheral side of the coil of the stator 34. In other words, part of the outer peripheral side of the torque converter 5 serving as a hydraulic transmission is depressed in the radial direction to thereby form a convex portion. This outer diameter reduced portion is provided inside of the stator 34 of the power generator 2. In short, the convex portion is formed at part of the outer peripheral side of the torque converter 5 and part of the coil of the stator 34 is arranged in the convex portion.

The reasons for making the above-stated embodiment possible are as follows. Part of the torque converter 5 that is placed inside of the inner peripheral side of the stator 34 is the lockup clutch 49. Since the lockup clutch 49 is formed into a multiple-plate structure, it is possible to secure necessary transmission torque capacity even if the outer dimensions of the lockup clutch 49 are reduced. In addition, if the lockup clutch 49 is engaged with the torque converter 5, the fluctuation of the input torque for the torque converter 5 is transmitted to the output side as it is. With the structure shown in FIG. 3, the damper 4 is arranged at the input side of the input shaft 23 and the fluctuation of the input torque for the torque converter 5 is suppressed or prevented. As a result, there is no need to provide a damper mechanism at the lockup clutch 49, thereby making it possible to provide a smaller diameter lockup clutch 49. For these reasons, in the above example, the outer diameter of the lockup clutch 49 is set smaller than that of the turbine runner 48.

Thrust roller bearings are provided between the input shaft 23 and the hub 46, between the hub 46 and the one-way clutch 43 and between the one-way clutch 43 and the flange portion of the cylindrical shaft 36, respectively. The function of the stator 35 of the torque converter 5 and that of the one-way clutch 43 that supports the stator 35A are the same as that of the conventional torque converter, which description will not be, therefore, given herein.

As described above, the torque converter 5 has a structure in which oil is filled in a hollow container consisting of the front cover 33, the pump shell 35, part of the input shaft 23 and part of the cylindrical shaft 36. If oil pressure increases, the overall torque converter 5 is slightly expanded. In that case, with the structure shown in FIG. 3, the input shaft 23 substantially integrated with the pump shell 35 is supported by the bearing 21 so that the input shaft 23 does not move axially. The cylindrical shaft 36 is, by contrast, supported by the bushing 40. Due to this, the deformation of the torque converter 5 resulting from the increased oil pressure is absorbed by the axial displacement of the cylindrical shaft 36. As a result, accuracy for supporting the torque converter 5 can be well maintained and the axially relative positions of the rotor 32 and the stator 34 at the motor generator 2 as well as those of the rotor 25 and the stator 29 at the resolver 7 are prevented from being displaced.

Figure 1:
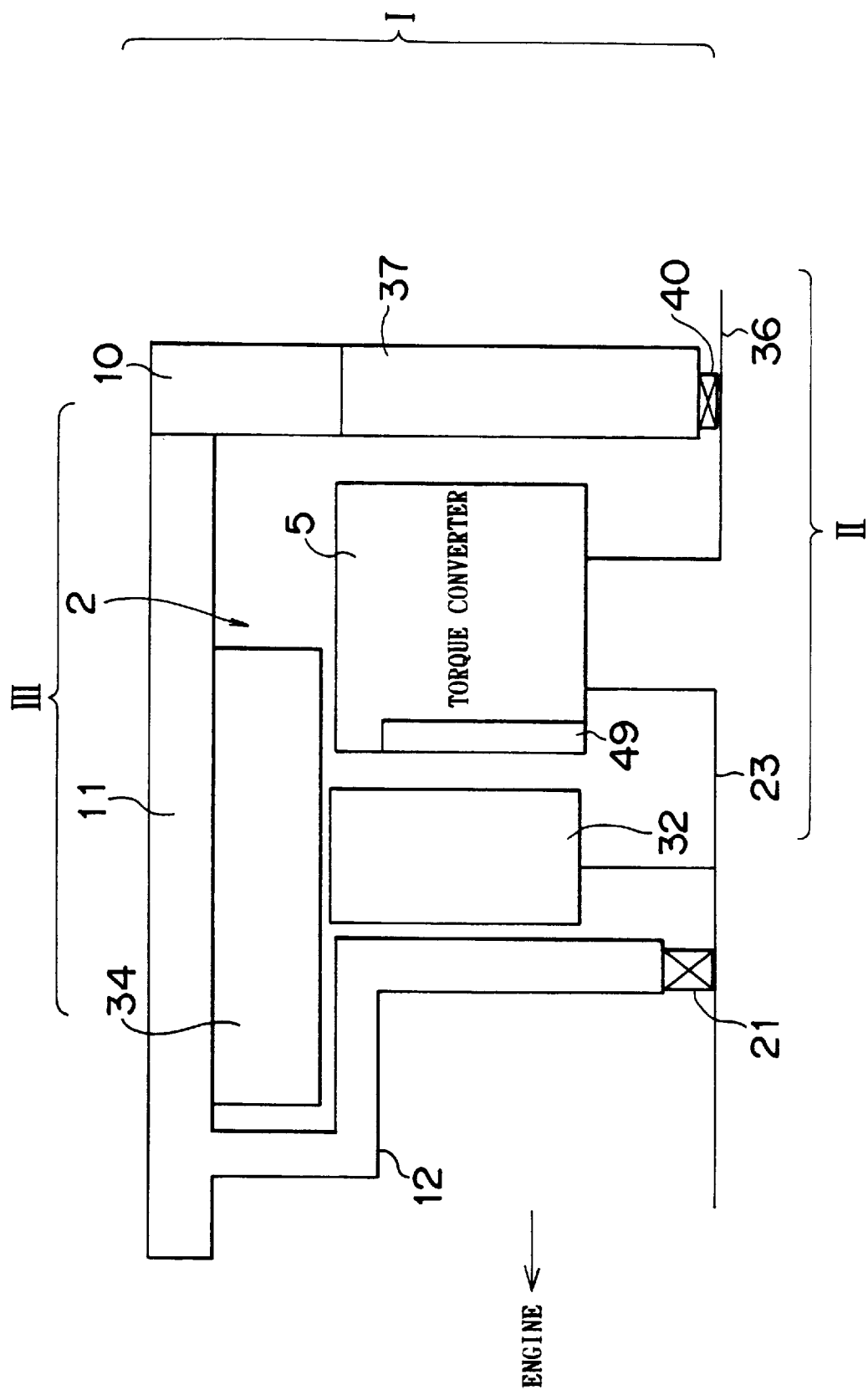
FIG. 1 is a typical view showing an example of the arrangement and support structure of a motor and a hydraulic power transmission according to the present invention.

Now, procedures for assembling the elements shown in FIG. 3 will be described. The hydraulic pump 37 is provided deep inside with respect to the torque converter 5, if seen from the opening end (or left opening end in FIG. 3) of the transmission housing 10. Thus, before assembling the torque converter 5 and the adapter 11, the hydraulic pump 37 is assembled inside the transmission housing 10. In this case, the bushing 40 is made fitted into the inner peripheral side of the boss portion 39 of the pump body 38 in advance. That is to say, as typically shown in FIG. 1, the hydraulic pump 37 and the bushing 40 are assembled into the torque converter housing 10 to thereby integrate them with each other as the first module I.

Meanwhile, the torque converter 5 is a sealed structure as a whole in which the pump impeller, the turbine runner 48, the lockup clutch 49, the stator 35A and the like are housed. Thus, these elements are assembled integrally with one another as the second module II in advance. In that case, as stated above, the hub portion 31 of the input shaft 23 becomes part of the shell of the torque converter 5 and the cylindrical shaft 36 is formed integrally with the inner peripheral end portion of the pump shell 35. Thus, the input shaft 23 and the cylindrical shaft 36 are also integrated as part of the second module II. Moreover, the rotor 32 of the motor generator 2 is fixed to the hub portion 31 of the input shaft 23 by fixing means such as welding and integrated as part of the second module II. The second module II is inserted from the opening end of the transmission housing 10 and assembled with the first module I.

Additionally, the stator 34 of the motor generator 2 is attached to the inner periphery of the adapter 11 and the bearing 21 is fixedly fitted into the cylindrical portion 20 at the inner periphery of the barrier plate portion 12 by the snap ring 22. These elements are integrated with one another as the third module III. Then, the third module III is assembled with the second module II, which has been assembled with the first module I. That is, while the input shaft 23 is being inserted into the bearing 21, the adapter 11 is abutted on the end portion of the transmission housing 10 and fixed thereto by a bolt or the like which is not shown in the drawings.

In this state, the stator 29 of the resolver 7 is attached onto the side surface at the opening side of the adapter 11 in the barrier plate portion 12, and the rotor 25 is fitted into the input shaft 23 through a key 26 and fixed thereto by the snap ring 27. The relative positions of the rotor 25 and the stator 29 are finely adjusted by loosening the bolt 30 and moving the stator 28 in the circumferential direction.

Finally, the first to third modules I, II and II thus assembled and integrated are assembled with the engine 1. That is, the flywheel 3 and the damper 4 are attached to the tip end portion of the crankshaft 13 of the engine 1 and the tip end portion of the input shaft 23 is inserted and fitted into the boss portion 16 of the driven side member 17, which is the output side member of the damper 4 by the spline. In this state, the adapter 11 is fixedly coupled to the engine by fixing means such as a bolt which is not shown.

With the above-stated structure, the adapter 11 is coupled and integrated with the transmission housing 10, the barrier plate portion 12 is formed integrally with the adapter 11 and the hydraulic pump 37 provided with the body 38 serving as a fixed structure is integrated with the transmission housing 10. Then, the input shaft 23 to which the rotor 32 of the motor generator 2 is attached is rotatably supported through the bearing 21 by the barrier plate portion 12. Also, the input shaft 23 as well as the cylindrical shaft 36 rotatably supported through the bushing 40 by the hydraulic pump 37 is integrated into the shell of the torque converter 5. As a result, the input shaft 23 is further supported by the hydraulic pump 37 substantially integrated with the adapter 11 to which the stator 34 is attached. In other words, since the member to which the stator 34 is attached and the member that supports the rotor 32 are substantially integrated with each other, the relative positions of the stator 34 and the rotor 32 are maintained at high accuracy and the displacements thereof can be effectively prevented.

With the above structure, by coupling the adapter 11 to the tip end portion of the transmission housing 10, the transmission housing 10 is turned into an extended state. At the same time, the barrier plate portion 12 is formed at the opening end side and the motor generator 2 is arranged inside the barrier plate portion 12. Then, the input shaft 23 is rotatably supported by the bearing fitted into the inner peripheral end of the barrier plate portion 12. If the bearing is a seal structure, therefore, the motor generator 2 surrounded by the adapter 11, the barrier plate portion 12 of the adapter 11, the transmission housing 10 and the hydraulic pump 37 is maintained fluid-tight. That is to say, the motor generator 2 is surrounded by them, as stated above, thereby facilitating sealing of the motor generator 2.

Figure 5:
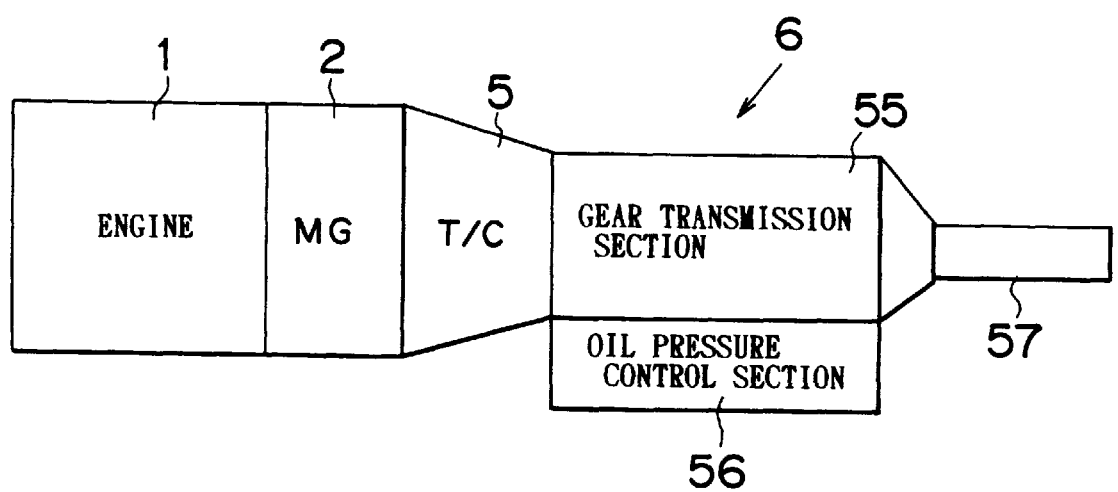
FIG. 5 is a typical view showing an exemplified arrangement of respective elements from an engine to a transmission according to the present invention.

The arrangement order of the elements which make up the drive device is shown in FIG. 5. Namely, this example shown is suited for a FR vehicle (front engine, rear drive vehicle) in which the engine 1 is installed longitudinally in the vehicle. The motor generator 2 is arranged at the output side of the engine 1 and the automatic transmission 6 is arranged at the output side of the motor generator 2 through the torque converter 5. The automatic transmission 6 is provided with a gear transmission section 55 and an oil pressure control section 56 to be described later and power is output from the gear transmission section 55 through an output shaft 57 extending backwards. In addition, the oil pressure control section 56 controls the engagement/disengagement of the lockup clutch 49, transmission, and the engagement pressure of the frictional engagement device. The oil pressure control section 56 is provided with a plurality of solenoid valves, switching valves and pressure regulation valves. Thus, the oil pressure control section 56 is constituted to conduct the above controls by electrically controlling the solenoid valves. It is noted that a well-known oil pressure control device for automatic transmission can be used as the oil pressure control section 56.

Figure 6:
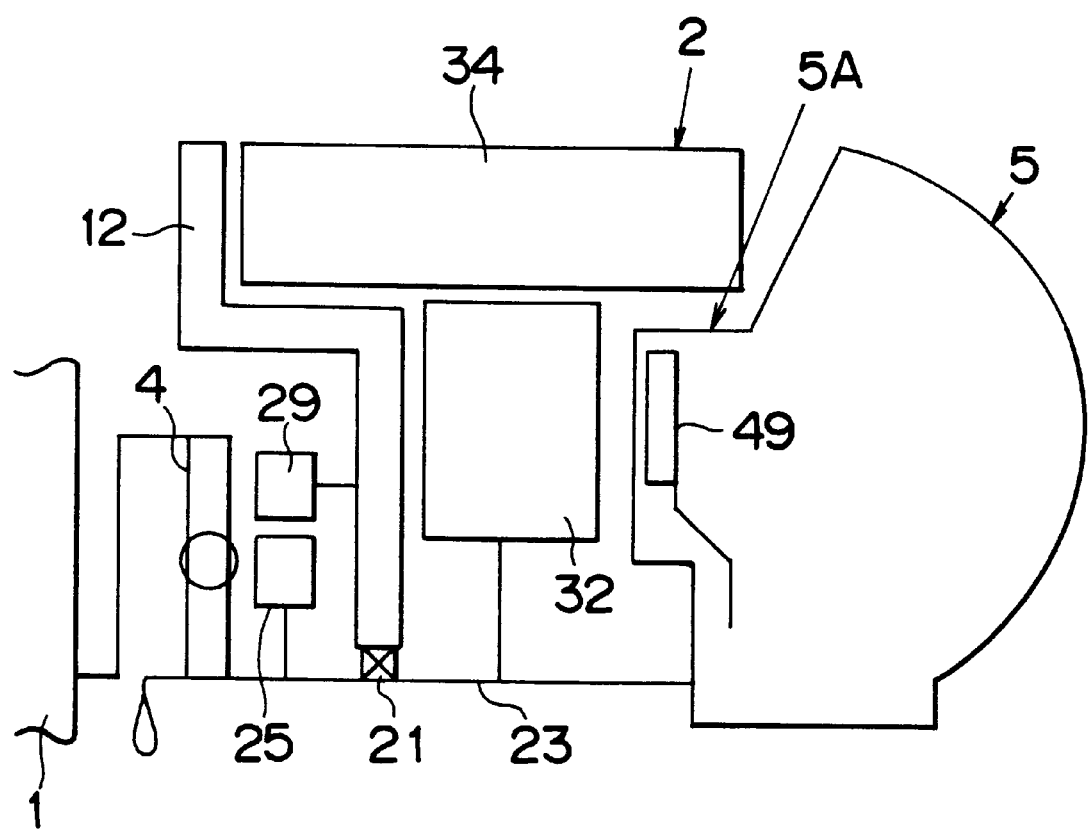
FIG. 6 is a typical view showing an exemplified arrangement and support structure of a motor and a hydraulic power transmission according to the present invention.

Next, among the above-stated aspects, one characteristic aspect of the present invention will be described with reference to the typical view of FIG. 6. The engine 1 as the first source of driving force, the damper 4 damping the output torque of the engine 1, the motor generator 2 as a motor and the torque converter 5 as a hydraulic transmission are arranged in the direction along the axis of the rotational center in this order. The stator 34 of the motor generator 2 is arranged to be radially distant from the axis of the rotational center, and the small diameter part 5A of the torque converter 5 is arranged at the inner periphery of the stator 34. The lockup clutch 49 is arranged inside the small diameter part 5A.

The input shaft 23 transmitting power to the motor generator 2 or the torque converter 5 is arranged along the axis of the rotational center. The rotor 32 is attached to the portion of the input shaft 23 that protrudes radially outward. The barrier plate portion 12 is arranged at the engine 1 side rather than the side of the stator 34 and the rotor 32 relative to the motor generator 2. The inner peripheral end portion of the barrier plate portion 12 extends inward radially from the rotor 32 and the bearing 21 that supports the input shaft 23 is arranged at the inner peripheral side of the portion 20. Thus, the bearing 21, the rotor 32 and the stator 34 are aligned radially. In other words, they are arranged substantially concentrically. Then, by using the bearing 21 of a seal structure, the space in which the motor generator 2 is arranged is maintained fluid-tight.

The stator 29 of the resolver 7 is attached to the engine 1 side surface of barrier plate portion 12 at a position radially inward from the inner periphery of the rotor 34. The rotor 25 positioned inside of the stator 29 radially is attached to the input shaft 23 such that the rotor 25 rotates integrally with the input shaft 23. This side surface is exposed to the outside before the assembly of the modules with the engine 1 is completed. This structure, therefore, facilitates making fine adjustment of the attachment position of stator 29 from the outside.

Furthermore, the damper 4 damping the output torque of the engine 1 and transmitting it to the input shaft 23 is arranged at the inner periphery of the stator 34 of the motor generator 2. That is, the resolver 7 and the damper 4 are arranged to overlap the stator 34 radially.

Figure 7:
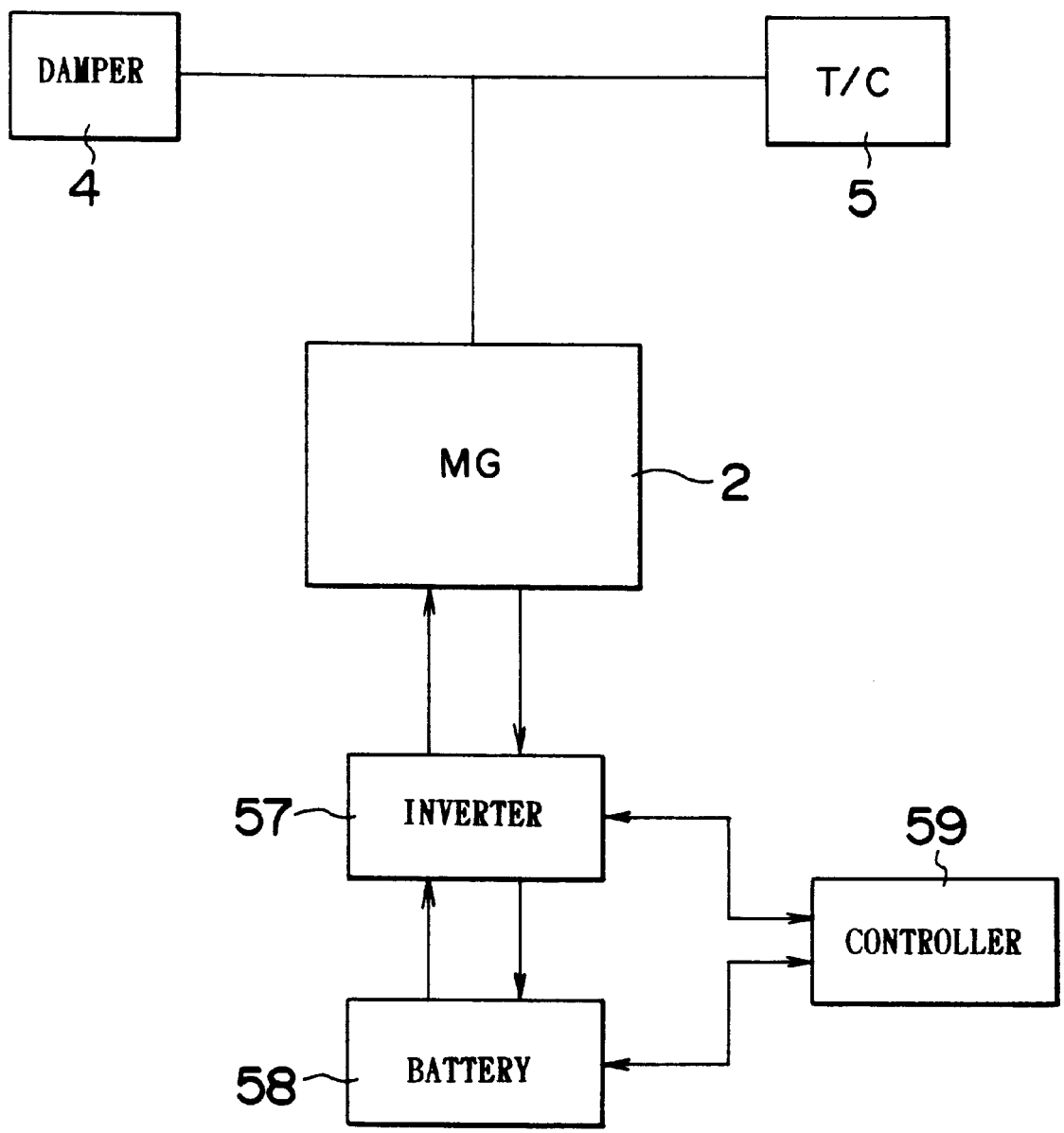
FIG. 7 is a block diagram showing the control system of a motor generator.

As stated above, the motor generator 2 is coupled to the member, which couples the damper 4 to the torque converter 5 or, more specifically, the input shaft 23. The vehicle runs, by driving the motor generator 2. Conversely, the motor generator 2 generates power and regenerates energy by transmitting power from the input shaft 23 to the motor generator 2. Due to this, a battery 58 is connected to the motor generator 2 through an inverter 57 as shown in FIG. 7.

The inverter 57, which is the same as the one conventionally used for the control of the motor generator 2, is provided to control the current and frequency for the motor generator 2 and to control the current at the time of generating power at the motor generator 2. There is also provided a controller 59 to allow the inverter 57 to control them. The controller 59 is, for example, mainly formed by a microcomputer to control the inverter 57 and the battery 58 in accordance with a request to start engine 1, a start or acceleration request, a braking request and the like.

An example of the control will be described. If a request to start the engine 1 is issued, current is supplied from the battery 58 to the motor generator 2 to thereby drive the motor generator 2. Using the thus supplied power, the crankshaft 13 is rotated. At the same time, fuel is supplied to the engine 1 to thereby start the engine 1. If a high driving force is requested for starting, acceleration or the like, the motor generator 2 is driven by the power of the battery 58, and the power of the motor generator 2 as well as that of the engine 1 are input to the torque converter 5. If a braking request accompanied by braking operation is issued, the motor generator 2 is rotated by the power transmitted from the input shaft 23 to generate power and the current is supplied to the battery 58 to thereby charge the battery 58. Therefore, kinetic energy is converted into electric energy, which energy becomes the load on the vehicle traveling to thereby provide a braking force. If the battery 58 is almost fully charged or the temperature increases to the upper limit, the charge of the battery 58 is limited and the battery charge is, therefore, stopped by opening a charging circuit or the like.

Figure 8:
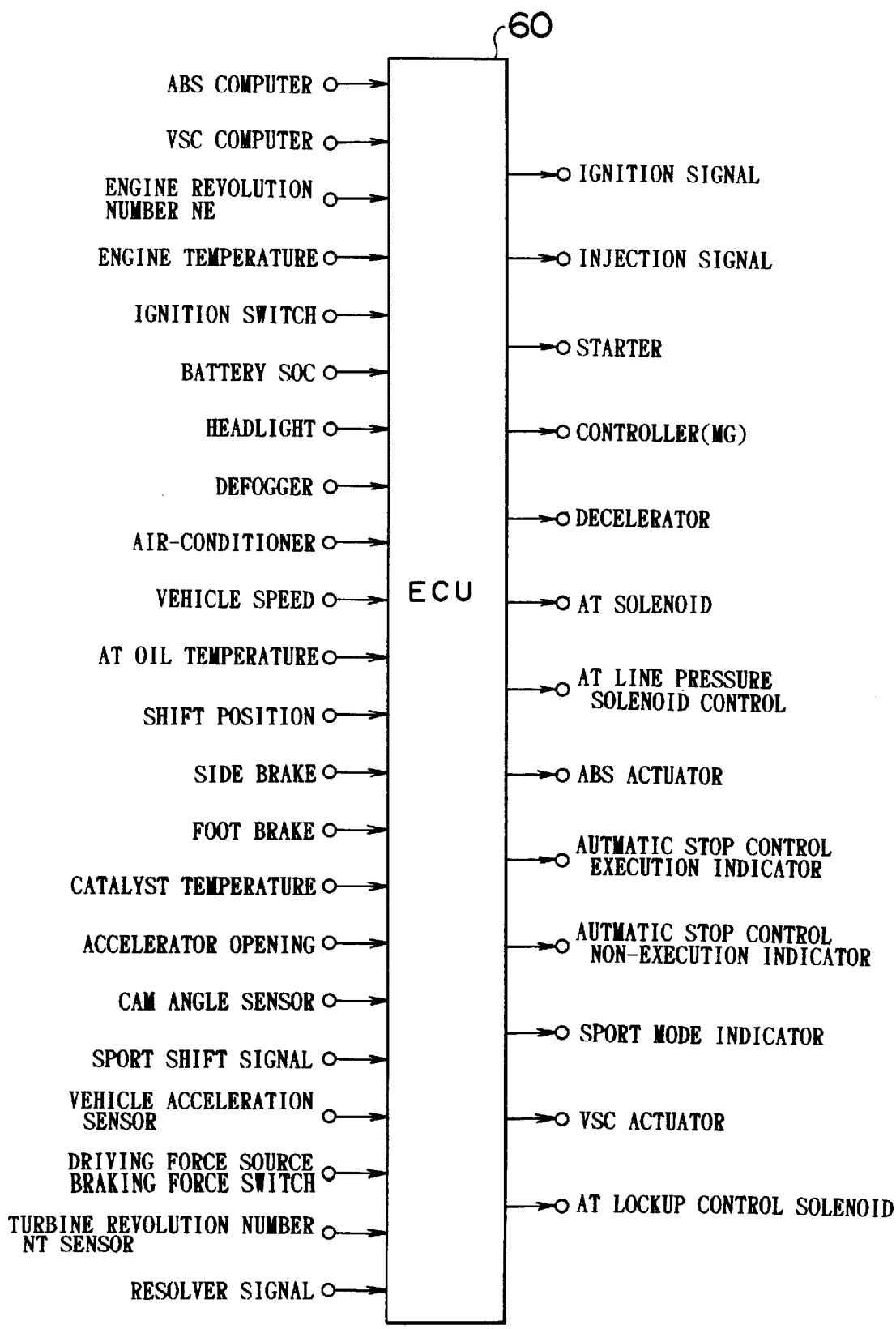
FIG. 8 shows an example of input and output signals in a integral control unit according to the present invention.

The respective devices such as the engine 1, the motor generator 2 and the automatic transmission 6 as described above are controlled based on various data indicating vehicle conditions. As shown in FIG. 8, for example, various types of signals are input to an integral control unit (ECU) 60 mainly comprised of a microcomputer. Arithmetic operation is conducted based on the various data and the results are output as control signals. The input signals involve, for example, a signal from an ABS (anti-lock brake) computer, a signal from a vehicle stabilizing control VSC™, a signal representing the engine revolution NE, a signal representing engine temperature, a signal from an ignition switch, a signal representing a battery SOC (State of Charge), an on/off signal for a headlight, an on/off signal for a defogger, an on/off signal for an air-conditioner, a vehicle speed signal, a signal representing the oil temperature of the automatic transmission (AT), a signal representing a shift position, an on/off signal for a side brake, an on/off signal for a foot brake, a signal representing the temperature of a catalyst (exhaust gas purifying catalyst), an accelerator opening signal, a signal from a cam angle sensor, a sport shift signal, a signal from a vehicle acceleration sensor, a signal from a driving force source braking force switch, a signal from a turbine revolution number NT sensor and a resolver signal.

The output signals involve, for example, an ignition signal, a combustion (fuel combustion) signal, a signal to a starter, a signal to the controller 59, a signal to a decelerator, a signal to an AT solenoid, a signal to an AT line pressure control solenoid, a signal to an ABS actuator, a signal to an air-conditioning compressor, a signal to a driving force source indicator, a signal to a sport mode indicator, a signal to a VSC actuator and a signal to an AT lockup control valve.

The above-stated drive device according to the present invention is basically used to output vehicle traveling power to the engine 1 or to decelerate the vehicle by the engine 1. The motor generator 2 is used to help the driving force or braking force for vehicle traveling. Therefore, the automatic transmission 6 is provided such that a plurality of transmission stages including a reverse stage can be set. One example of the gear transmission section 55 is shown in FIG. 9.

Figure 9:
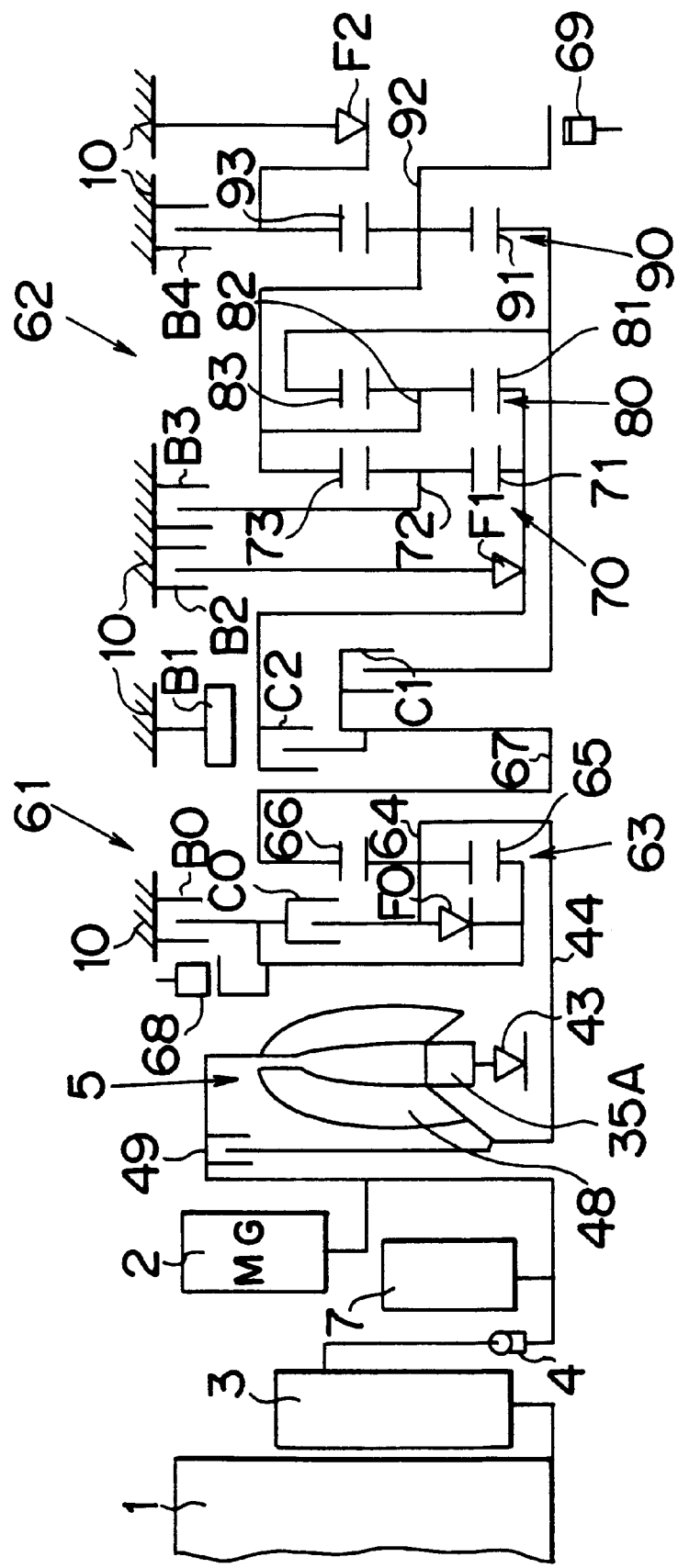
FIG. 9 is a skeleton view showing an example of the gear train of an automatic transmission according to the present invention.

With the constitution shown in FIG. 9, the speeds of five forward speeds and one reverse speed are set. That is, the automatic transmission 6 shown therein is provided with a sub-transmission portion 61 and a main transmission portion 62 following the torque converter 5. The sub-transmission portion 61, which is a so-called overdrive portion, consists of a set of single pinion-type epicyclic gear mechanisms 63. A carrier 64 is coupled to the transmission input shaft 44 and a one-way clutch FO and an integral clutch CO are arranged in parallel between the carrier 64 and a sun gear 65. It is noted that the one-way clutch FO is designed to be engaged if the sun gear 65 positively rotates (or rotates in the rotational direction of the transmission input shaft 44) relatively to the carrier 64. A multiple-plate brake BO is provided to selectively stop the rotation of the sun gear 65. A ring gear 66, which is the output element of the sub-transmission portion 61, is connected to an intermediate shaft 67, which is the input element of the main transmission portion 62.

Therefore, in the sub-transmission portion 61, all of the epicyclic gear mechanisms 63 rotate as a unit while either the multiple-plate clutch CO or the one-way clutch FO is engaged. Due to this, the intermediate shaft 67 rotates at the same speed as that of the transmission input shaft 44 to thereby turn the transmission 6 in a low speed stage. Also, while the brake BO is engaged to stop the rotation of the sun gear 65, the ring gear 66 is accelerated and positively rotates for the transmission input shaft 44 to thereby turn the transmission 6 into a high speed stage.

On the other hand, the main transmission portion 62 is provided with three sets of epicyclic gear mechanisms 70, 80 and 90 which are coupled as follows. The sun gear 71 of the first epicyclic gear mechanism 70 and the sun gear 81 of the second epicyclic gear mechanism 80 are integrally coupled to each other. The ring gear 73 of the first epicyclic gear mechanism 70, the carrier 82 of the second epicyclic gear mechanism 80 and the carrier 92 of the third epicyclic gear mechanism 90 are coupled to one another, and an output shaft 57 is coupled to the carrier 92. Further, the ring gear 83 of the second epicyclic gear mechanism 80 is coupled to the sun gear 91 of the third epicyclic gear mechanism 90.

In the gear sequence of the main transmission portion 62, four speed stages of rear and forward stages can be set and the clutches and brakes therefor are set as follows. The description with respect to clutches will be explained first. The first clutch C1 is provided between the ring gear 83 of the second epicyclic gear mechanism 80 and the sun gear 91 of the third epicyclic gear mechanism 90, which are coupled to each other, and the intermediate shaft 67. The second clutch C2 is provided between the sun gear 71 of the first epicyclic gear mechanism 70 and the sun gear 81 of the second epicyclic gear mechanism 80, and the intermediate shaft 67.

As for the brakes, the first brake B1, which is a band brake, is arranged to stop the rotation of the sun gears 71 and 81 of the first and second epicyclic gear mechanisms 70 and 80, respectively. The first one-way clutch F1 and the second brake B2, which is a multiple-plate brake, are arranged in series between the sun gears 71, 81 (i.e., a common sun gear shaft) and the transmission housing 10. The first one-way clutch F1 is designed to be engaged if the sun gears 71 and 81 inversely rotate (or rotate in the direction opposite to the rotational direction of the transmission input shaft 44). The third brake B3, which is a multiple-plate brake, is provided between the carrier 72 of the first epicyclic gear mechanism 70 and the transmission housing 10. The fourth brake B4, which is a multiple-plate brake and serves to stop the rotation of the ring gear 93 of the third epicyclic gear mechanism 90, and the second one-way clutch F2 are arranged in parallel, with the transmission housing 10 placed therebetween. The second one-way clutch F2 is designed to be engaged if the ring gear 93 is to inversely rotate.

Also provided are a turbine rotation number sensor 68 for detecting the number of rotations of the clutch C0 of the sub-transmission portion 61 out of the rotating members of the respective transmission portion 61 and 62 and an output shaft rotation number sensor 69 for detecting the number of rotations of the output shaft 57.

In the above-stated automatic transmission 6, as shown in the operation table of FIG. 10, it is possible to set speed stages of five forward stages and one reverse stage by engaging/disengaging the clutches and brakes. It is noted that ○ mark denotes an engagement state, a blank denotes a disengagement stage, Δ mark denotes an engagement state while the engine is being braked and ⓧ mark denotes a state in which a clutch or brake is engaged but irrelevant to power transmission.

Figure 11:
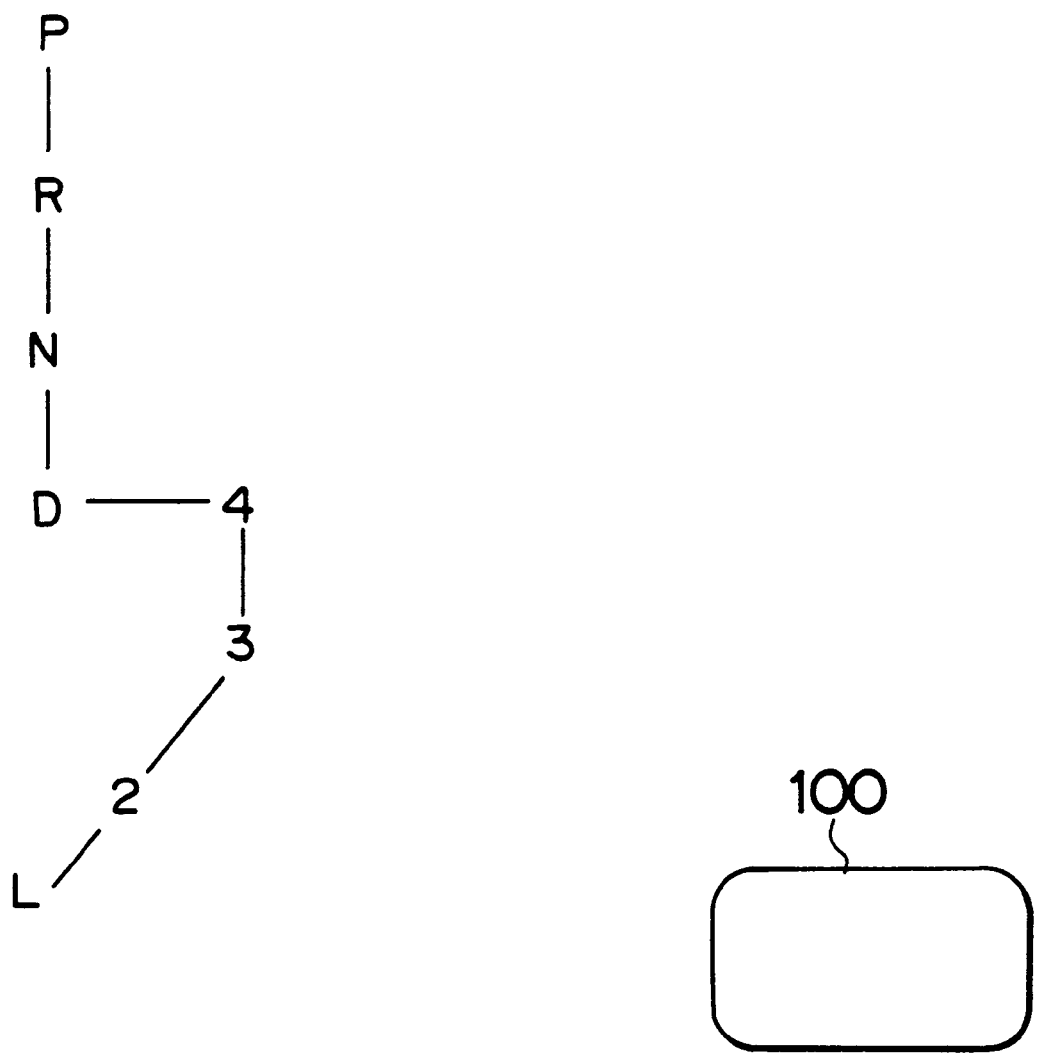
FIG. 11 shows an array of shift lever positions in the automatic transmission.

Shift states of P (parking), R (reverse), N (neutral), and the first speed (1st) to fifth speed (5th) shown in FIG. 11 are set by manually operating a lever of a shift device, which is not shown in the drawings. The array of the respective shift positions set by the shift lever is shown in FIG. 11. P (parking) position, R (reverse) position, N (neutral) position and D (drive) position are arranged in the longitudinal direction of the vehicle in this order. The "4" position is arranged at a position adjacent D position in a vehicle depth direction. The "3" position is arranged adjacent the position "4" in the aft direction of the vehicle. The "2" position and L position are arranged off to the lower left of the position "3" in this order.

It is noted that the D position is a position to set the speed at the first to fifth forward speeds based on the vehicle traveling conditions such as vehicle speed or accelerator opening. The "4" position, "3" position, "2" position and L position are positions to set speed at the first to fourth, the first to third, the first and second, and the first forward speed, respectively. The "3" position and L position are positions to set an engine brake range and arranged such that the engine brake works in the highest speed stage among those speeds set.

By selecting either D position or L position with the shift lever, the vehicle speed can be set in accordance with the position. That is, this is for a transmission mode in which a speed stage is set manually, i.e., a sport mode described above. A speed mode switch 100 for selecting a speed mode is provided at an instrumental panel or a center console (neither of which are shown in the drawings). While the switch 100 is turned on, if the shift lever is set at D position, speed is set at the fifth forward speed. If set at "4" position, speed is set at the fourth forward speed. If set at "3" position, speed is set at the third forward speed. If set at "2" position, speed is set at the second forward speed. If set at L position, speed is set at the first forward speed.

In the drive device with the structure stated above, therefore, when the motor generator 2 is arranged between the engine 1 and the torque converter 5, the stator 34 and the rotor 32 of the motor generator 2 are arranged radially outward as much as possible and part of the torque converter 5, the resolver 7 and the damper 4 are arranged at the inner peripheral side of the stator 34. Thus, it is possible to increase the output torque of the motor generator 2 and to array these elements tight radially. As a result, the axial length of the overall drive device can be shortened. Further, with the above-stated construction, the barrier plate portion 12 extends into the inner peripheral side of the rotor 32 and the input shaft 23 is supported by the bearing 21 fitted into the inner peripheral end portion. Due to this, it is possible to close the space in which the motor generator 2 is arranged by the bearing 21, to enhance sealing property for the motor generator 2 and to simplify seal structure.

Figure 12:
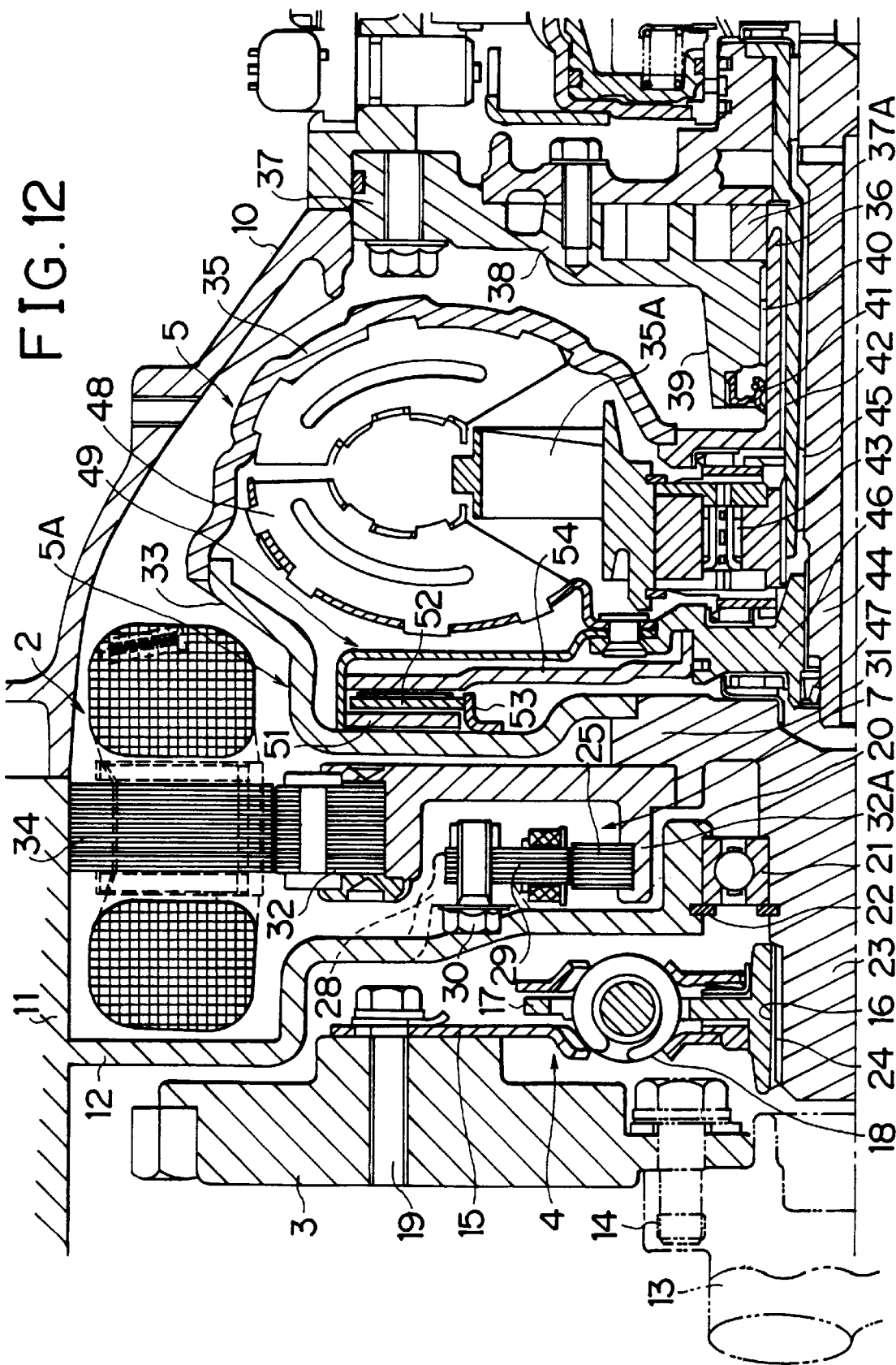
FIG. 12 is a partial cross-sectional view specifically showing another embodiment of a drive device according to the present invention.

In the above embodiment, the resolver 7 serving as a detector is arranged outside of the space in which the motor generator 2 is housed. However, since it is still preferable that dust, water and the like are prevented from attaching to the resolver 7, which is an electric device, the resolver 7 may be arranged in the space in which the motor generator 2 is housed. FIG. 12 shows the latter case. In the embodiment shown in FIG. 12, the position of the resolver 7 is changed opposed to that in the preceding embodiment. Description will be, therefore, given only to the constituent elements different from those in FIG. 3 and not to the same elements. The same elements in FIG. 12 are denoted by the same reference numerals as those in FIG. 3.

A cylindrical portion 32A protruding toward the engine 1 side is formed at the portion at which a rotor 32 of a motor generator 2 is attached to a hub portion 31. A rotor 25 of a resolver 7 is formed on the outer peripheral surface of the cylindrical portion 32A. Since the cylindrical portion 32A is formed at the rotor 32, the barrier plate portion 12 is formed to be arranged at the tip end portion side of the cylindrical portion 32A. Due to this, the barrier plate portion 12 is slightly shifted from the rotor radially. A cylindrical portion 20, which is formed at the inner periphery of the barrier plate portion 12, extends toward the inner periphery of the cylindrical portion 32A. Thus, a bearing 21 fitted into the cylindrical portion 20 is positioned radially inward with respect to the resolver 7.

A plurality of faucet fitting portions 28 are provided at the inner peripheral side (motor generator 2 side) of the barrier plate portion 12 while a predetermined distance is kept from one another circumferentially. A bolt hole passing through the barrier plate portion 12 is formed in the faucet fitting portion 28 and the stator 29 fitted into the portion 28 is fixed by the bolt 30 inserted into the bolt hole. The bolt hole, which is a circumferentially elongated hole, is provided such that the circumferential position at which the stator 29 is attached can be finely adjusted while loosening the bolt 30. In this way, the resolver 7 is housed in the space at the internal surface side of the barrier plate 12 closed by the bearing 21 and arranged at the inner peripheral side of the stator 34 of the motor generator 2.

As can be seen from the above, with the constitution shown in FIG. 12, the bearing 21, the resolver 7, the rotor 2 and the stator 34 are arranged to overlap one another radially. This makes it possible to reduce the number of parts arranged along the axis and, therefore, to shorten the axial length of the device. Further, since the cylindrical portion 32A is formed at the inner peripheral end portion of the rotor 32 in the motor generator 2 and the rotor 25 of the resolver 7 is attached to the cylindrical portion 32A, the position at which the rotor 32 is attached to the input shaft 23, i.e., at which the rotor 32 is welded to the hub portion 31, is shifted axially from the rotor 25. As a result, the position is shifted axially win respect to the bearing 21. This means that the attachment surface of the input shaft 23 to which the bearing 21 is attached is shifted axially from the position at which the rotor 32 is welded to the input shaft 23, thereby facilitating processing of the attachment surface (slide surface) of the bearing 21.

Next, among the above-stated aspects, another characteristic aspect of the present invention will be described with reference to the typical view of FIG. 13. As shown, the input shaft 23 passes through the inner peripheral end of the barrier plate portion 12 and the input shaft 23 is rotatably supported by the bearing 21 arranged at the inner peripheral end of the barrier plate portion 12. A radially protruding portion is formed at the end portion of the input shaft at the torque converter 5 side. The front cover 33 of the torque converter 5 is fixedly attached to the protruding portion and the rotor 32 of the motor generator 2 is attached thereto in a state in which the rotor 32 protrudes radially. The cylindrical portion 32A axially extending from the rotor 32 is positioned at the outer periphery of the bearing 12 radially, to which position the rotor 25 of the resolver 7 is fixedly attached. Further, the stator 29 of the resolver 7 is arranged to be fixedly attached to the barrier plate portion 12 at the further outer periphery.

Figure 13:
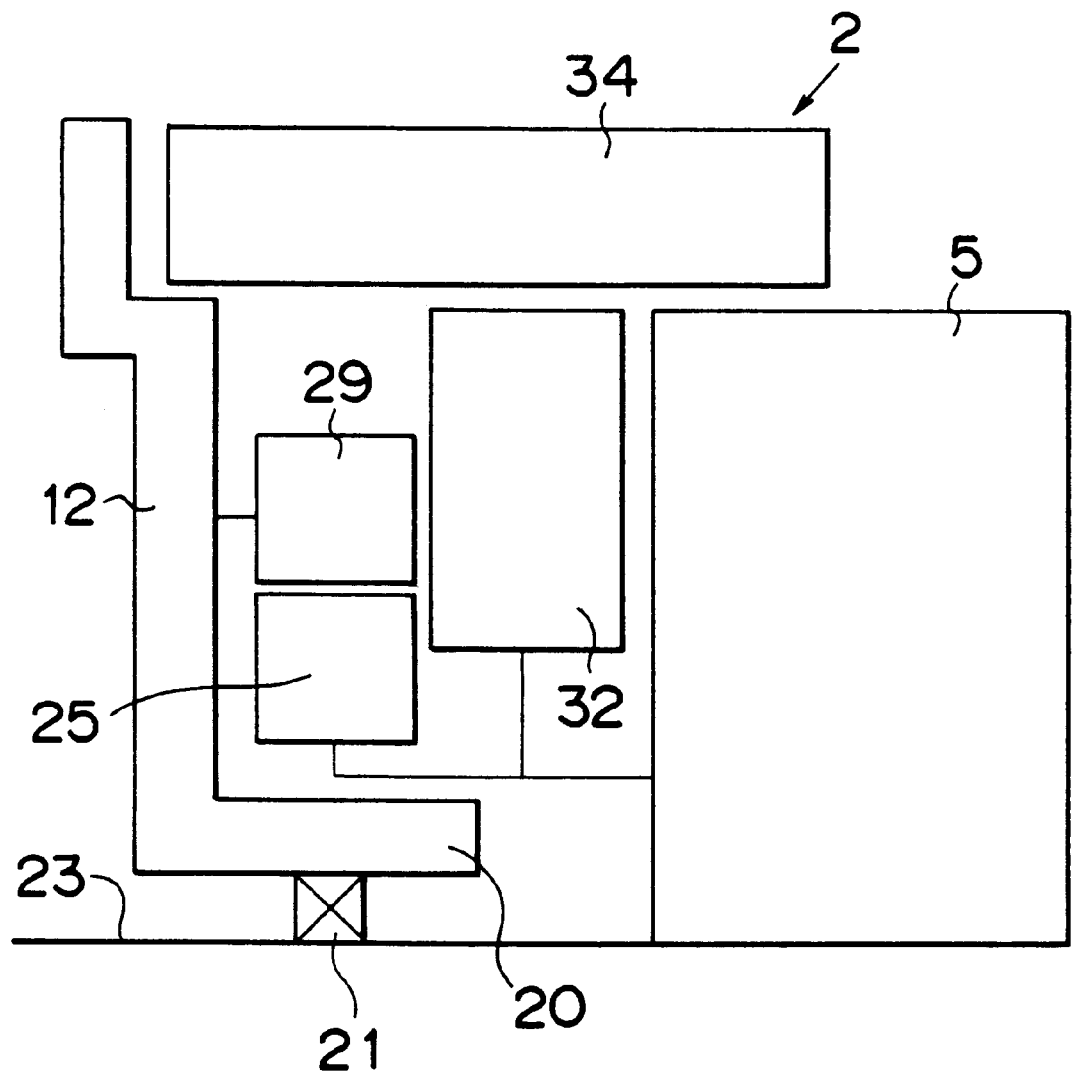
FIG. 13 is a typical view showing an example of the arrangement and support structure of a motor and a hydraulic power transmission in another embodiment according to the present invention.

In another aspect of the present invention shown in FIGS. 12 and 13, the rotor 25 of the resolver 7 is fixedly attached to the rotor 32 of the motor generator 2. These elements as well as the torque converter 5 are integrated into a module as a unit. The stator 29 of the resolver 7 is attached to the barrier plate portion 12. Thus, these elements as well as the stator 34 of the motor generator 2 are integrated into a module as a unit. The respective modules are sequentially assembled in the same manner as in the preceding aspect.

In another aspect of the present invention shown in FIGS. 12 and 13, part of the torque converter 5, the resolver 7 and the damper 4 are arranged at the inner periphery of the rotor 34 of the motor generator 2, thereby shortening the axial length of the overall drive device.

Moreover, in the above-stated drive device, if the engine 1 is driven, flywheel 3 rotates together with crankshaft 13. Since the engine 1 converts the linear motion of the piston following fuel combustion into a rotational motion and outputs power, the output torque is fluctuated in accordance with fuel combustion. The flywheel 3 has a large angular moment of inertia, so that the fluctuation (or pulsation) of the output torque of the engine 1 is leveled by the flywheel 3. In addition, the damper 4 is constituted to arrange damper spring 18 between driving side member 15 fixed to the flywheel 3 and driven side member 16 fitted into the input shaft 23 by a spline. Due to this, the damper spring 18 is expanded or compressed in accordance with the fluctuation of the power transmitted from the flywheel 3 to the driving side member 15. In other words, a damping function occurs and the oscillation or pulsation of the torque transmitted to the driven side member 16 is further suppressed by the damping function.

The driven side member 16 of the damper 4 and the input shaft 23 are coupled by spline 24. Due to this, even if the spline 24 has an unavoidable slight rattle, it is possible to prevent or suppress the teeth of the spline 24 from repeatedly abutting one another. That is, it is possible to prevent or suppress abnormal sound or noise resulting from the transmission of power output by the engine 1.

If the lockup clutch 49 is engaged, power is transmitted from the front cover 33, which is the input side member of the torque converter 5, to the hub 46, which is the output side member thereof, substantially as it is. However, the damper 4 positioned upstream of the lockup clutch 49 in a power transmission direction cancels or suppresses the fluctuation (pulsation) of the power at the engine 1. Thus, even if the lockup clutch 49 is engaged with the converter 5 and the power transmitted from the input shaft 23 is output to the transmission input shaft 44 as it is, oscillation does not worsen. That is, there is no need to provide a damping mechanism such as a damper in the lockup clutch 49, with the result that the lockup clutch 49 or the torque converter 5 can be made small in size.

The power output from the engine 1 is transmitted to the input shaft 23 while the oscillation or pulsation thereof is being suppressed as stated above. Since the input shaft 23 is integrally formed with the front cover 33 through the hub portion 31, the power output from the engine 1 is eventually transmitted to the torque converter 5. The rotor 32 communicates with the input shaft 23 through the hub portion 31. If the motor generator 2 is actuated and driven, the power output from the motor generator 2 as well as that from the engine 1 is transmitted to the torque converter 5. Furthermore, if the torque converter 5 is driven by the power input from the transmission 6 side, the motor generator 2 can generate electric power and, at the same time, generate a damping force.

In the above-stated drive device, the front cover 33 is fixed to the hub portion 31 of the input shaft 23 by fixing means such as welding, whereby the shell of the torque converter 5 can be tight-sealed and the sealing property is further ensured. Since it is possible to couple the input shaft 23 and the torque converter 5 by means of the fixing structure, there is no need to use a particular coupling member and the space necessary for the coupled portion can be reduced. As a result, the axial length of the overall device can be shortened. Further, since the hub portion 31 has a cylindrical shape of a short axial length and the rotor 32 and the front cover 33 are fixed to the outer peripheral portion of the hub portion 31 by means of, for example, welding, an assembly operation can be facilitated, thereby providing a drive device of good productivity.

It is noted that the present invention should not be limited to the above-described embodiments.

The particular shapes, structure or arrangement can be modified appropriately. For instance, the hub portion integral with the input shaft may be modified to that which is not integral with the input shaft but integral with parts that are independently worked and fabricated. The shape of such a hub portion is not limited to a cylindrical shape. Also, many radiation fins may be attached onto the outer peripheral surface of the adapter 11 or a hollow to introduce cooling water may be formed at the adapter 11 so as to cool the motor generator 2. The number of friction plates in the lockup clutch 49 is not limited to two as shown in the above embodiments and more friction plates may be provided. Furthermore, the bearing 21 is provided with sealing material so as to maintain the space in which the motor generator 2 is housed in a fluid-tight state. Instead, another seal material different from the bearing 21 may be provided.

Moreover, according to the present invention, the resolver can be omitted depending on the types of motors used. If the resolver is provided, it may be provided at the inner side of the barrier plate, i.e., at the motor generator 2 side. According to the present invention, the motor may be arranged in the back of the hydraulic transmission, i.e., at the transmission side. In that case, the bushing 40 is changed to a bearing member of a type that can prevent the axial movement of the rotating member and the bearing 21 is changed to a bearing member of a type that allows the axial movement of the rotating member. Additionally, the present invention can be applied to a drive device for an electric vehicle only provided with a motor as a source of driving force. Furthermore, the functional device supporting the rotating member attached to the shell of the hydraulic transmission is not limited to the above-described hydraulic pump. Any devices can be freely selected as long as they are fixed to the housing.

What is claimed is:

1. A vehicle drive device comprising:
a motor including a rotating member; and
a hydraulic transmission provided adjacent the motor in a direction of a rotational center axis and having a shell housing a fluid, the hydraulic transmission including a first rotating member and a second rotating member,
the first rotating member extending axially in one direction to said shell, integrally coupled to said shell and said rotating member of said motor and rotatably supported by a bearing member while an axial movement of said first rotating member is prohibited,
the second rotating member extending axially to said shell and in a direction opposite to the one direction of said first rotating member, integrally coupled to said shell and rotatably supported by a bearing member while an axial movement of said second rotating member is allowed.

2. The vehicle drive device according to claim 1, wherein the hydraulic transmission is a torque converter.

3. The vehicle drive device according to claim 1, wherein the bearing member for the first rotating member is a roller.

4. The vehicle drive device according to claim 1, wherein the bearing member for the second rotating member is a bush.

5. A vehicle drive device comprising:
a first housing having an inner peripheral surface;
a barrier plate portion protruding radially inward from said inner peripheral surface of said first housing;
a second housing to which said first housing is attached;
a motor having a stator fixed onto an inner peripheral surface of said first housing and a rotor relatively rotating with said stator;
a functional device fixed to said second housing;
a hydraulic transmission provided inside of the second housing and adjacent the motor in a direction of a rotational center axis, the hydraulic transmission having a first rotating member, a second rotating member and a shell housing a fluid,
the first rotating member extending axially in one direction to said shell, integrally coupled to said shell and said rotating member of said motor and rotatably supported by a bearing member fixed at inner peripheral side of the barrier plate portion while an axial movement of said first rotating member is prohibited,
the second rotating member extending axially to said shell and in a direction opposite to the one direction of said first rotating member, integrally coupled to said shell and rotatably supported by the function device while an axial movement of said second rotating member is allowed.

6. The vehicle drive device according to claim 5, wherein the hydraulic transmission is a torque converter.

7. The vehicle drive device according to claim 5, wherein the bearing member for the first rotating member is a roller.

8. The vehicle drive device according to claim 5, wherein the bearing member for the second rotating member is a bush.

9. The vehicle drive device according to claim 5, wherein one portion of the barrier plate is provided inside of the stator in axial direction with respect to the motor.

10. The vehicle drive device according to claim 5, wherein the function device is a oil pump which supplies fluid to the hydraulic transmission.

11. The vehicle drive device according to claim 10, wherein the second rotating member is supported by a body of the oil pump.

12. A vehicle drive device comprising:
a first housing having an inner peripheral surface;
a barrier plate portion protruding radially inward from said inner peripheral surface of said first housing;
a second housing to which said first housing is attached;
a functional device fixed to said second housing;
a motor having a stator fixed onto an inner peripheral surface of said first housing and a rotor relatively rotating with said stator;
a hydraulic transmission provided inside of said second housing and adjacent said motor in a direction of a rotational center axis, said hydraulic transmission having a shell housing a fluid; and
shaft members integral with said rotor, said shaft members being rotatably supported by a bearing member attached to an inner peripheral portion of said barrier plate portion and rotatably supported by said functional device,
wherein said stator of said motor and said hydraulic transmission are arranged to at least partially radially overlap.

13. The vehicle drive device according to claim 12, wherein the hydraulic transmission is a torque converter.

14. The vehicle drive device according to claim 12, wherein one portion of the barrier plate is provided inside of the stator in an axial direction with respect to the motor.

15. A vehicle drive device comprising:
a first source of driving force that generates power;
a motor arranged on the rotational center axis of the first source of driving force, the motor including a stator arranged to be radially distant from the rotational center axis and a rotor relatively rotating with said stator; and
a hydraulic transmission having a small diameter portion formed to have a smaller outer diameter than an inner diameter of said stator, the small diameter portion being inserted axially into an inner periphery of said stator, and into which power is transmitted from the first source of driving force,
wherein the stator of the motor and a portion of the hydraulic transmission radially overlap.

16. The vehicle drive device according to claim 15, wherein the hydraulic transmission comprises:
an input side member;
an output side member; and
a clutch radially arranged inside said small diameter portion and directly coupling said input side member and said-output side member.

17. The vehicle drive device according to claim 15, wherein the hydraulic transmission is a torque converter.

18. A vehicle drive device comprising:
a first source of driving force that generates power, and has an output member;
a hydraulic transmission into which power is transmitted from said first source of driving force;
a motor arranged between said first source of driving force and the hydraulic transmission, said motor including a stator arranged to be radially distant from a rotational center axis of the motor and a rotor relatively rotating with said stator; and
a damper coupled to the output member of the first source of driving force, said damper being arranged to extend axially into an inner periphery of said stator and damping the power transmitted from said first source of driving forces,
wherein the stator of the motor and a portion of the hydraulic transmission are arranged to radially overlap.

19. A vehicle drive device according to claim 18, further comprising:
a barrier plate portion arranged between said stator and said rotor, and a member arranged on a side of said first source of driving force in the axial direction with respect to the stator and the rotor.

20. The vehicle drive device according to claim 18, wherein the hydraulic transmission is a torque converter.

21. A vehicle drive device comprising:
a first source of driving force that generates power;
a hydraulic transmission into which power is transmitted from said first source of driving force;
a motor arranged between said first source of driving force and said hydraulic transmission and including a stator arranged to be radially distant from a rotational center axis and a rotor relatively rotating with said stator; and
a detector arranged on a side of an inner periphery of said stator that detects relative rotational positions of said stator and said rotor.

22. The vehicle drive device according to claim 21, further comprising:

a barrier plate portion arranged between said stator and said rotor, and a member arranged on a side of said first source of driving force in the axial direction with respect to the stator and the rotor.

23. The vehicle drive device according to claim 21, wherein said detector comprises a detector stator and a detector rotor, the device further comprising a barrier plate portion arranged between said detector and the stator and the rotor of said motor, wherein the detector stator is attached onto a side surface of said barrier plate portion facing said first source of driving force, and said detector rotor and the rotor of the motor are attached to a rotating shaft passing through said barrier plate portion.

24. The vehicle drive device according to claim 21, wherein the hydraulic transmission is a torque converter.

25. A vehicle drive device comprising:

a first source of driving force that generates power;

a hydraulic transmission into which the power is transmitted from said first source of driving force;

an input shaft arranged along a rotational center axis of said hydraulic transmission and coupled to said hydraulic transmission;

a motor arranged between said first source of driving force and said hydraulic transmission and including a stator arranged to be radially distant from the rotational center axis and a rotor attached to the radially extending portion of said input shaft;

a barrier plate portion that extends radially outward from the center axis to separate said first source of driving force and said motor, said barrier plate portion including a through hole passing through said input shaft; and a detector that detects relative rotations of said stator and said rotor in a rotation direction, said detector including a detector rotor attached to the radially extending portion of said input shaft to axially extend into an inner periphery of the rotor of said motor, and a detector stator fixed onto an inner wall surface of said barrier plate portion and radially facing said detector rotor.

26. The vehicle drive device according to claim 25, wherein the hydraulic transmission is a torque converter.

27. A vehicle drive device comprising:

a first source of driving force that generates power;

a second source of driving force that has a rotational member;

a rotating input member to which the power is transmitted from said first source of driving force, said rotating input member having a hub portion provided with a radially-protruding plate-shape portion; and a hydraulic transmission, into which the power is transmitted from said first source of driving force, said hydraulic transmission including a shell housing a fluid, wherein part of said shell of said hydraulic transmission is formed by a front cover having an opening portion formed at a rotational center axis, the front cover being integrally fixed to the hub portion and the hub portion forming the part of said shell by fitting the plate-shape portion of said hub portion into the opening portion of the front cover, the rotational member of said second source of driving force is integrally attached to a portion of the hub portion positioned outside of said shell, and the second source and a portion of the hydraulic transmission radially overlap.

28. The vehicle drive device according to claim 27, wherein said rotating input member includes an input shaft coupled to the output member of said first source of driving force and said hub portion is formed integrally at an end portion of said input shaft facing said hydraulic transmission.

29. The vehicle drive device according to claim 27, wherein the hydraulic transmission is a torque converter.

30. A vehicle drive device, comprising:

a first source of driving force that generates power, and has an output member;

a second source of driving force that has a rotational member;

a damper mechanism having an output side member and an input side member attached to the output member of said first source of driving force; and a hydraulic transmission having an input shaft coupled through a spline to the output side member of said damper mechanism and a shell which houses a fluid and is attached to the input shaft and, the rotational member of said second source of driving force being coupled through the input shaft to part of the shell, wherein the second source and a portion of the hydraulic transmission radially overlap.

31. The vehicle drive device according to claim 30, wherein the hydraulic transmission is a torque converter.

* * * * *